US008072258B2

(12) United States Patent
Yamahira

(10) Patent No.: US 8,072,258 B2
(45) Date of Patent: Dec. 6, 2011

(54) BOOSTER CIRCUIT

(75) Inventor: Seiji Yamahira, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/938,108

(22) Filed: Nov. 2, 2010

(65) Prior Publication Data

US 2011/0063018 A1 Mar. 17, 2011

Related U.S. Application Data

(63) Continuation of application No. PCT/JP2010/003226, filed on May 12, 2010.

(30) Foreign Application Priority Data

Sep. 15, 2009 (JP) ................................ 2009-213077

(51) Int. Cl.
*G05F 1/10* (2006.01)
*G05F 3/02* (2006.01)

(52) U.S. Cl. ........................................ 327/536

(58) Field of Classification Search .................. 327/536; 363/59–60

See application file for complete search history.

(56) References Cited

U.S. PATENT DOCUMENTS

| | | | |
|---|---|---|---|
| 6,501,325 B1 | 12/2002 | Meng | |
| 6,794,927 B2 | 9/2004 | Bedarida et al. | |
| 6,995,603 B2 | 2/2006 | Chen et al. | |
| 7,023,260 B2 | 4/2006 | Thorp et al. | |
| 7,176,746 B1 | 2/2007 | Wang et al. | |
| 2004/0263238 A1 | 12/2004 | Thorp et al. | |
| 2007/0273431 A1 | 11/2007 | Sakurai et al. | |
| 2008/0186081 A1 * | 8/2008 | Yamahira et al. | 327/536 |
| 2009/0295452 A1 | 12/2009 | Yamahira | |

FOREIGN PATENT DOCUMENTS

JP 2009-290992 12/2009

* cited by examiner

*Primary Examiner* — Quan Tra

(74) *Attorney, Agent, or Firm* — McDermott Will & Emery LLP

(57) ABSTRACT

In a booster circuit which is operated with a two-phase clock and in which a plurality of (M≧4) lines of boosting cells constitute a unit, a boosting cell in the K-th line (1≦K≦M) is controlled, depending on the voltage of the input terminal of a boosting cell in the KA-th line (KA=(K−1) when (K−1)>0, and KA=M when (K−1)=0). As a result, a charge transfer transistor can transition from the conductive state to the non-conductive state before a clock input to the boosting cell in the K-th line transitions from low to high and then boosting operation is performed. As a result, the backflow of charge via the charge transfer transistor can be reduced or prevented.

15 Claims, 15 Drawing Sheets

Time T1 (= Time T5) (Boosting Standby State)

Time T2 (Boosting State)

Time T3 (Boosting State)

Time T4 (Charge Transfer State)

FIG.5

| Operating State of Boosting Cell | | Input Clock | Voltage Conditions | | State of Charge Transfer Transistor Controlled Under Voltage Conditions | |
|---|---|---|---|---|---|---|
| | | CLK | V(Sig) | V(SourceN) | Example Gate Voltage: VN1 | State |
| 1 | Boosting Standby State | L | ≤ V(OUTPUT) − \|Vtm3\| | ≥ V(Sig) − Vtm2 | = V(OUTPUT) | Non-Conductive |
| 2 | Boosting State | H | ≤ V(OUTPUT) − \|Vtm3\| | ≥ V(Sig) − Vtm2 | = V(OUTPUT) | Non-Conductive |
| 3 | Charge Transfer State | L | ≥ V(OUTPUT) − \|Vtm3\| | ≤ V(Sig) − Vtm2 | = V(SourceN) | Conductive |

*Forbidding Voltage Conditions During Operating State Transition : $V(SourceN) \leq V(Sig) - Vtm2$ and $V(Sig) \leq V(OUTPUT) - |Vtm3|$ Example) $V(SourceN) = VV1 \leq V(Sig) - Vtm\ 2 = VV2 - Vtm2$ And $V(Sig) = VV2 \leq V(OUTPUT) - |Vtm3| = VV3 - |Vtm3|$

*Tolerable Voltage Conditions During Operating State Transition : $V(SourceN) = V(Sig) = V(OUTPUT)$ Example) $V(SourceN) = VV2 \leq V(Sig) = VV2 \leq V(OUTPUT) = VV2$

BOOSTER CIRCUIT

CROSS-REFERENCE TO RELATED APPLICATIONS

This is a continuation of PCT International Application PCT/JP2010/003226 filed on May 12, 2010, which claims priority to Japanese Patent Application No. 2009-213077 filed on Sep. 15, 2009. The disclosures of these applications including the specifications, the drawings, and the claims are hereby incorporated by reference in their entirety.

BACKGROUND

The present disclosure relates to booster circuits.

In recent years, for flash memories, which are a type of non-volatile storage devices, there has been a demand for data read operation and data rewrite operation which are performed with a single power supply voltage or low power supply voltages. To meet the demand, an on-chip booster circuit may be required which supplies a positive or negative boosted voltage when each operation is performed.

The booster circuit is also becoming a key technology to ensure an operating margin of a non-volatile storage device or an analog circuit in a CMOS process.

FIG. 14 shows a configuration of a conventional booster circuit (see, for example, U.S. Pat. No. 7,176,746). The booster circuit 900 performs boosting operation in accordance with two input clock signals CLK1 and CLK2 having different phases. Reference characters 901*a*-901*e* each indicate a charge transfer cell which transfers charge from the preceding stage to the succeeding stage, and reference characters 902*a*-902*d* each indicate a boosting capacitor which boosts the output of a charge transfer cell.

FIG. 15 is a diagram showing details of the charge transfer cells 901*a*-901*e*. A reference character 903 indicates a charge transfer transistor. Reference characters 904 and 905 indicate switching transistors provided in each of the charge transfer cells 901*a*-901*e*, which switch between the input voltage of a charge transfer cell in the preceding stage and the output voltage of the each charge transfer cell, depending on an input to the each charge transfer cell.

Next, operation of the booster circuit 900 of FIG. 14 will be briefly described with reference to FIG. 16.

Initially, at time T1, the clock signal CLK1 transitions from low to high, so that the voltages of the boosting capacitors 902*a* and 902*c* are boosted. As a result, the voltages of the output terminals OUT of the charge transfer cells 901*a* and 901*c* are boosted, so that the switching transistors 905 of the charge transfer cells 901*a* and 901*c* transition to the conductive state, and therefore, the charge transfer transistors 903 are set to the non-conductive state. At the same time, the switching transistors 904 of the charge transfer cells 901*b* and 901*d* transition to the conductive state, and therefore, the charge transfer transistors 903 transition to the conductive state. By the aforementioned operation, charge on the output terminals having the boosted voltages of the charge transfer cells 901*a* and 901*c* is transferred to the output terminals of the charge transfer cells 901*b* and 901*d*.

At time T2 (a period of time Ttrans after time T1), the clock signal CLK2 transitions from low to high, so that the voltages of the boosting capacitors 902*b* and 902*d* are boosted. As a result, the voltages of the output terminals OUT of the charge transfer cells 901*b* and 901*d* are boosted, so that the switching transistors 905 of the charge transfer cells 901*b* and 901*d* transition to the conductive state, and therefore, the charge transfer transistors 903 are set to the non-conductive state. At the same time, the switching transistors 904 of the charge transfer cells 901*c* and 901*e* transition to the conductive state, and therefore, the charge transfer transistors 903 transition to the conductive state. By the aforementioned operation, charge on the output terminals having the boosted voltages of the charge transfer cells 901*b* and 901*d* is transferred to the output terminal of the charge transfer cell 901*c* and the output terminal of the booster circuit 900.

Thereafter, at time T3, boosting operation similar to that which is performed at time T1 is repeated.

SUMMARY

However, in the conventional booster circuit, after the clock signal transitions from low to high and the voltage of a boosting capacitor is then boosted, the switching transistor in the preceding stage transitions to the conductive state and the charge transfer transistor is set to the non-conductive state. Therefore, immediately after the boosting, boosted charge flows backward to the further preceding stage via the charge transfer transistor, resulting in a decrease in boosting efficiency, which is a problem.

The detailed description describes implementations of a booster circuit with high boosting efficiency which is operated using a two-phase clock and in which a plurality of (M≧4) boosting cell lines constitute a unit.

An example booster circuit includes boosting cells arranged in M parallel lines (M≧4) and L stages (L≧2) and configured to perform boosting operation in synchronization with a plurality of clock signals having different phases. Each of the boosting cells includes a first boosting capacitor having two ends, one of the two ends being connected to an output terminal of the each boosting cell, and a clock signal corresponding to the each boosting cell being received at the other end, a charge transfer transistor connected between an input terminal and the output terminal of the each boosting cell, and a state controller configured to control the charge transfer transistor. The input terminal of one of the boosting cells located in the same stage as that of the each boosting cell and in a first one of the lines other than the line of the each boosting cell, is connected to a control terminal of the state controller, whereby the M boosting cells in the same stage are connected in a ring shape. Therefore, after the charge transfer transistor of the boosting cell is set from the conductive state to the non-conductive state, the boosting cell can perform boosting operation, whereby the backflow of charge via the charge transfer transistor can be reduced or prevented.

As described above, according to the present disclosure, the charge transfer transistor can be set to the non-conductive state during boosting operation without using a complicated clock, whereby the decrease in boosting efficiency can be reduced or prevented.

The charge transfer transistor used in the boosting cell and the backflow preventing cell may be configured using a P-channel transistor. Therefore, in this case, even when a twin-well CMOS process is employed, the substrate bias effect of the charge transfer transistor can be reduced or prevented, and the area of the booster circuit can be reduced by the reduction or prevention of the decrease in boosting efficiency.

A control signal to the boosting cell in the K-th line may be connected to the input terminal of the boosting cell in the A-th preceding line (1≧A≧M/2−1). In this case, an optimum boosting standby state time and a sufficient charge transfer time can be set with respect to the charge transfer transistor.

According to the present disclosure, the control terminals of the state controllers of the boosting cells in the same stage are limited not only by similar connection conditions, but also by predetermined voltage constraints. Therefore, the charge transfer transistor can be set to the non-conductive state during boosting operation without using a complicated clock, whereby the decrease in boosting efficiency can be reduced or prevented.

BRIEF DESCRIPTION OF THE DRAWINGS

FIG. 5 is a diagram showing operating modes and voltage constraints of the boosting cell of the booster circuit of FIG. 1.

DETAILED DESCRIPTION

Figure 1:
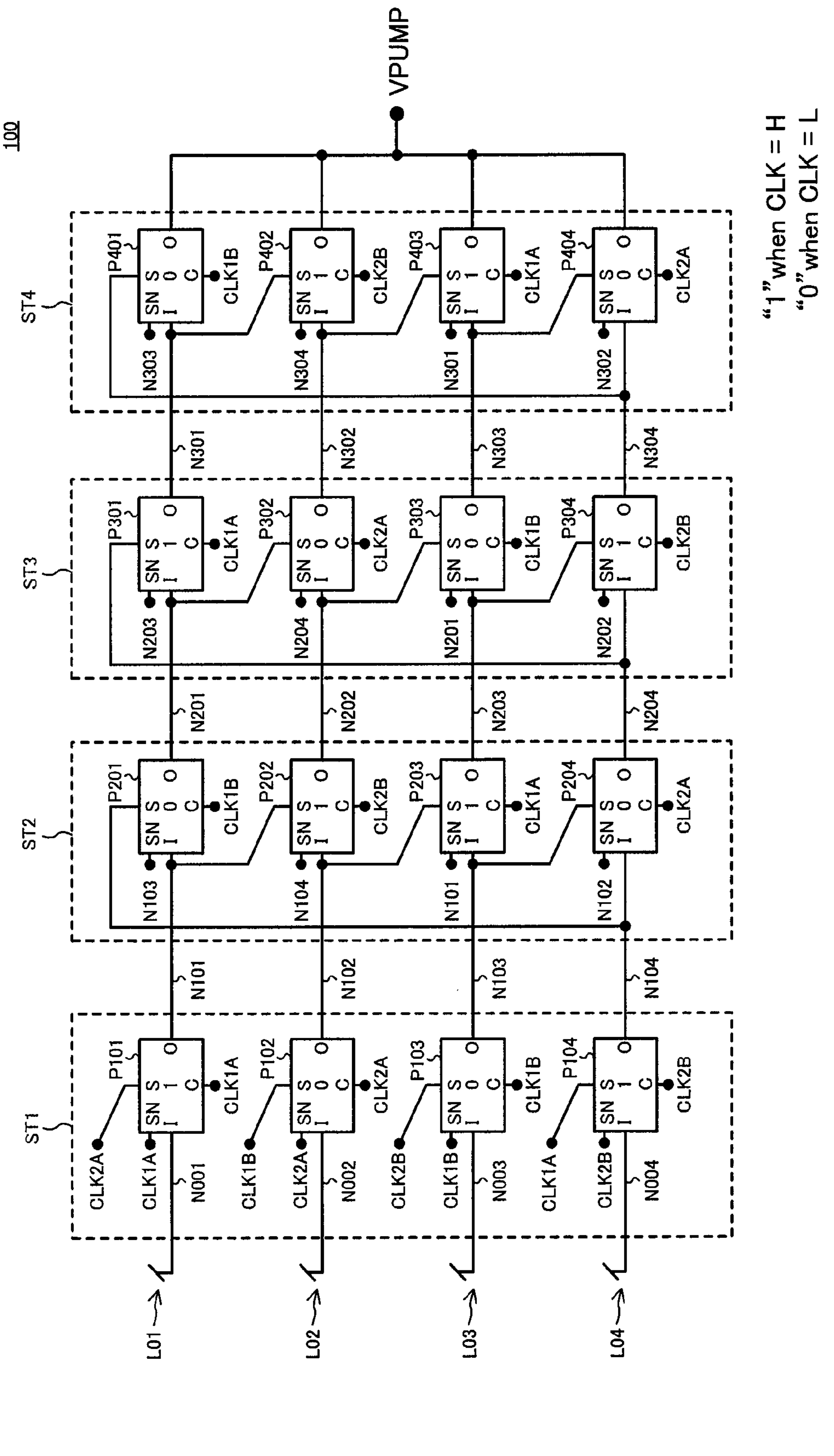
FIG. 1 is a block diagram showing a configuration of a booster circuit according to a first embodiment of the present disclosure.

Embodiments of the present disclosure will be described in detail hereinafter with reference to the accompanying drawings. Like parts are indicated by like reference characters throughout the specification.

First Embodiment

<Configuration>

FIG. 1 shows a configuration of a booster circuit 100 according to a first embodiment of the present disclosure. The booster circuit 100 includes a plurality of boosting cell lines L01-L04. Boosting cells are also arranged into boosting stages ST1-ST3 and a backflow preventing circuit ST4. Of the boosting cell lines L01-L04, the first boosting stage ST1 includes boosting cells P101-P104, the second boosting stage ST2 includes boosting cells P201-P204, the third boosting stage ST3 includes boosting cells P301-P304, and the backflow preventing circuit ST4 includes backflow preventing cells P401-P404. The boosting cells are each operated in synchronization with a clock signal CLK1A, CLK2A, CLK1B, or CLK2B, whereby boosting operation is performed.

A plurality of (N=4) signals, i.e., the clock signals CLK1A, CLK2A, CLK1B, and CLK2B, have a phase difference of about 360 degrees/N. The clock signal CLK1A transitions from low to high, then the clock signal CLK2A transitions from low to high, then the clock signal CLK1B transitions from low to high, and then finally the clock signal CLK2B transitions from low to high. It is preferable that a pair of the clock signals CLK1A and CLK1B, and a pair of the clock signals CLK2A and CLK2B, each have a phase difference of about 180 degrees. Although the clock signals CLK1A and CLK1B are input to the boosting cell lines L01 and L03, a clock signal CLK3B corresponding to the clock signal CLK1B and a clock signal CLK3A corresponding to the clock signal CLK1A may be input to the boosting cell line L03. Similarly, a clock signal CLK4B corresponding to the clock signal CLK2B and a clock signal CLK4A corresponding to the clock signal CLK2A may be input to the boosting cell line L04. Reference characters N001-N004, N101-N104, N201-N204, and N301-N304 indicate input/output terminals of the boosting cells P101-P104, P201-P204, and P301-P304. Note that, in FIG. 1, terminals indicated by the same reference character are connected to each other.

Here, the order of the boosting cell lines will be described. As a representative example, the boosting stage ST3 will be described. What will be described about the boosting stage ST3 is also true of the other boosting stages and the backflow preventing circuit.

The order of the boosting cell lines is the order in which the clock signals input to the boosting cells P301-P304 included in the boosting stage ST3 transition from low to high. Therefore, the boosting cell line L01 having the boosting cell P301 which receives the clock signal CLK1A is the first line. The boosting cell line L02 having the boosting cell P302 which receives the clock signal CLK2A which transitions from low to high after the clock signal CLK1A has transitioned from low to high is the second line. The boosting cell line L03 having the boosting cell P303 which receives the clock signal CLK1B which next transitions from low to high is the third line. Similarly, the boosting cell line L04 in the boosting cell P304 which receives the clock signal CLK2B which next transitions from low to high is the fourth line, which is the final line. This is true of when the number of boosting cell lines is more than four. In this case, the order of the boosting cell lines is also the order in which clock signals input to boosting cells in any boosting stage transition from low to high (the same is true of when the clock signals transition from high to low).

The boosting cells P101, P201, and P301 and the backflow preventing cell P401 in the boosting cell line L01 are connected in series. The boosting cells P101 and P301 in the (2K+1)th stages (K≧0) as counted from the head receive the clock signal CLK1A, and the boosting cell P201 in the (2K+2)th stage as counted from the head receives the clock signal CLK1B. The backflow preventing cell P401 receives the clock signal CLK1B, which is the same signal received by the boosting cell P201 in the stage immediately preceding the final stage in which the boosting cell P301 is provided.

The boosting cells P102, P202, and P302 and the backflow preventing cell P402 in the boosting cell line L02 are connected in series. The boosting cells P102 and P302 in the (2K+1)th stages (K≧0) as counted from the head receive the clock signal CLK2A, and the boosting cell P202 in the (2K+2)th stage as counted from the head receives the clock signal CLK2B. The backflow preventing cell P402 receives the clock signal CLK2B, which is the same signal received by the boosting cell P202 in the stage immediately preceding the final stage in which the boosting cell P302 is provided.

The boosting cells P103, P203, and P303 and the backflow preventing cell P403 in the boosting cell line L03 are connected in series. The boosting cells P103 and P303 in the (2K+1)th stages (K≧A) as counted from the head receive the clock signal CLK1B, and the boosting cell P203 in the (2K+2)th stage as counted from the head receives the clock signal CLK1A. The backflow preventing cell P403 receives the clock signal CLK1A, which is the same signal received by the boosting cell P203 in the stage immediately preceding the final stage in which the boosting cell P303 is provided.

The boosting cells P104, P204, and P304 and the backflow preventing cell P404 in the boosting cell line L04 are connected in series. The boosting cells P104 and P304 in the (2K+1)th stages (K≧0) as counted from the head receive the clock signal CLK2B, and the boosting cell P204 in the (2K+2)th stage as counted from the head receives the clock signal CLK2A. The backflow preventing cell P404 receives the clock signal CLK2A, which is the same signal received by the boosting cell P204 in the stage immediately preceding the final stage in which the boosting cell P304 is provided.

As a result, the boosting states of the boosting clocks at a predetermined time of the boosting cells P101-P104, P201-P204, and P301-P304, and the backflow preventing cells P401-P404 are indicated by "1" where the boosting cell performs boosting operation or "0" where the boosting cell does not perform boosting operation.

Next, the boosting cells P101-P104, P201-P204, and P301-P304, and the backflow preventing cells P401-P404 included in the boosting stages ST1-ST4 will be described.

Of the boosting cells P101-P104 included in the first boosting stage ST1, the boosting cell P101 in the boosting cell line L01 receives the clock signal CLK2A, which is in antiphase with the clock signal CLK2B input to the boosting cell P104 in the boosting cell line L04. The boosting cell P101 performs boosting operation by switching between the voltage of the input/output terminal N101 of the boosting cell P101 and the voltage of the clock signal CLK1A input to the boosting cell P101, depending on the clock signal CLK2A.

Similarly, the boosting cell P102 in the boosting cell line L02 receives the clock signal CLK1B, which is in antiphase with the clock signal CLK1A input to the boosting cell P101 in the boosting cell line L01. The boosting cell P102 performs boosting operation by switching between the voltage of the input/output terminal N102 of the boosting cell P102 and the voltage of the clock signal CLK2A input to the boosting cell P102, depending on the clock signal CLK1B.

The boosting cell P103 in the boosting cell line L03 receives the clock signal CLK2B, which is in antiphase with the clock signal CLK2A input to the boosting cell P102 in the boosting cell line L02. The boosting cell P103 performs boosting operation by switching between the voltage of the input/output terminal N103 of the boosting cell P103 and the voltage of the clock signal CLK1B input to the boosting cell P103, depending on the clock signal CLK2B.

The boosting cell P104 in the boosting cell line L04 receives the clock signal CLK1A, which is in antiphase with the clock signal CLK1B input to the boosting cell P103 in the boosting cell line L03. The boosting cell P104 performs boosting operation by switching between the voltage of the input/output terminal N104 of the boosting cell P104 and the voltage of the clock signal CLK2B input to the boosting cell P104, depending on the clock signal CLK1A.

These mean that, in the first boosting stage ST1 of the M (M=4) boosting cell lines L01-L04 arranged in parallel, the boosting cell in the K-th line switches between the output terminal voltage of the boosting cell in the K-th line and a clock signal input to the boosting cell in the K-th line, depending on a clock signal which is in antiphase with a clock signal input to the boosting cell in the (K−1)th line (1≦K≦M, (K−1)=M when K=1).

Of the boosting cells P201-P204 included in the second boosting stage ST2, the boosting cell P201 in the boosting cell line L01 is connected to the input/output terminal N104 of the boosting cell P204 in the boosting cell line L04. The boosting cell P201 performs boosting operation by switching between the voltage of the input/output terminal N201 of the boosting cell P201 and the voltage of the input/output terminal N103 of the boosting cell P203 in the boosting cell line L03 which is operated with a clock which is in antiphase with the clock of the boosting cell P201, depending on the voltage of the input/output terminal N104.

Similarly, the boosting cell P202 in the boosting cell line L02 is connected to the input/output terminal N101 of the boosting cell P201 in the boosting cell line L01. The boosting cell P202 performs boosting operation by switching between the voltage of the input/output terminal N202 of the boosting cell P202 and the voltage of the input/output terminal N104 of the boosting cell P204 in the boosting cell line L04 which is operated with a clock which is in antiphase with the clock of the boosting cell P202, depending on the voltage of the input/output terminal N101.

The boosting cell P203 in the boosting cell line L03 is connected to the input/output terminal N102 of the boosting cell P202 in the boosting cell line L02. The boosting cell P203 performs boosting operation by switching between the voltage of the input/output terminal N203 of the boosting cell P203 and the voltage of the input/output terminal N101 of the boosting cell P201 in the boosting cell line L01 which is operated with a clock which is in antiphase with the clock of the boosting cell P203, depending on the voltage of the input/output terminal N102.

The boosting cell P204 in the boosting cell line L04 is connected to the input/output terminal N103 of the boosting cell P203 in the boosting cell line L03. The boosting cell P204 performs boosting operation by switching between the voltage of the input/output terminal N204 of the boosting cell P204 and the voltage of the input/output terminal N102 of the boosting cell P202 in the boosting cell line L02 which is operated with a clock which is in antiphase with the clock of the boosting cell P204, depending on the voltage of the input/output terminal N103.

As described above, in the second boosting stage ST2, the boosting cell in the K-th line is connected to the input terminal of the boosting cell in the (K−1)th line (1≦K≦M, (K−1)=M when K=1). The boosting cell in the K-th line performs boosting operation by switching between the output terminal voltage of the boosting cell in the K-th line and the input terminal voltage of a boosting cell which is operated at a phase which is different by about 180 degrees from that of the boosting cell in the K-th line, depending on the voltage of the input terminal of the boot cell in the (K−1)th line.

The third boosting stage ST3 and the backflow preventing circuit ST4 are operated in a manner similar to that of the second boosting stage ST2.

Note that the number of boosting stages is not limited to three.

<Configuration of Boosting Cell>

Figure 2A:
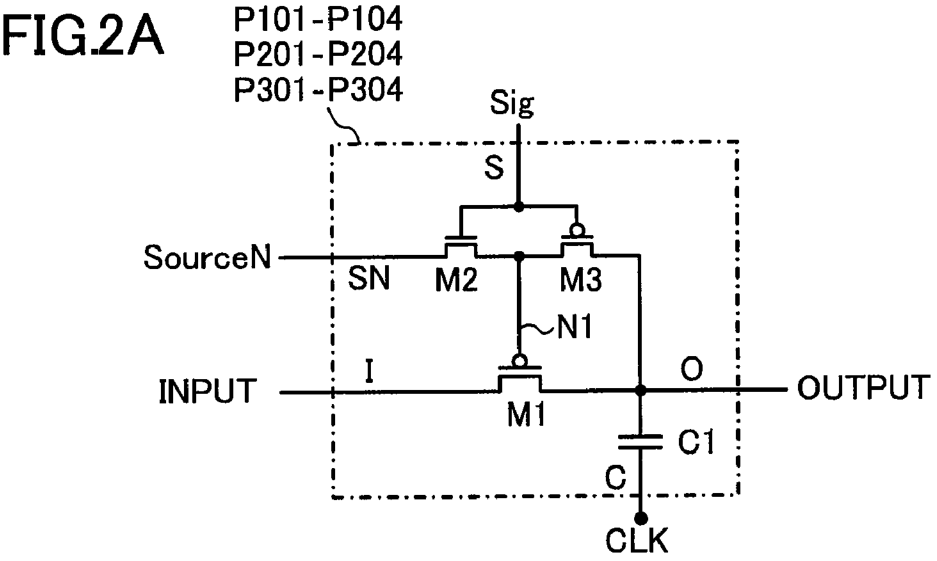
FIGS. 2A-2C are circuit diagrams showing configurations of a boosting cell and a backflow preventing cell of FIG. 1.

FIG. 2A shows a configuration of each of the boosting cells P101-P104, P201-P204, and P301-P304 of FIG. 1. The boosting cells P101-P104, P201-P204, and P301-P304 each include a charge transfer transistor M1, an on-switch transistor M2, an off-switch transistor M3, and a boosting capacitor C1. Here, the on-switch transistor M2 and the off-switch transistor M3 constitute a state controller for the charge transfer transistor M1.

The charge transfer transistor M1 transfers charge from an input terminal INPUT to an output terminal OUTPUT. The on-switch transistor M2 supplies the voltage of a source signal SourceN to the gate N1 of the charge transfer transistor M1, depending on the voltage of a control signal Sig, thereby causing the charge transfer transistor M1 to be in the conductive state. The off-switch transistor M3 equalizes the voltages of the gate N1 of the charge transfer transistor M1 and the output terminal OUTPUT, depending on the voltage of the control signal Sig, thereby causing the charge transfer transistor M1 to be in the non-conductive state. The boosting capacitor C1 is pumped in synchronization with one of the clock signals CLK1A, CLK2A, CLK1B, and CLK2B input to the boosting cells P101-P104, P201-P204, and P301-P304.

<Backflow Preventing Cell>

Figure 2B:
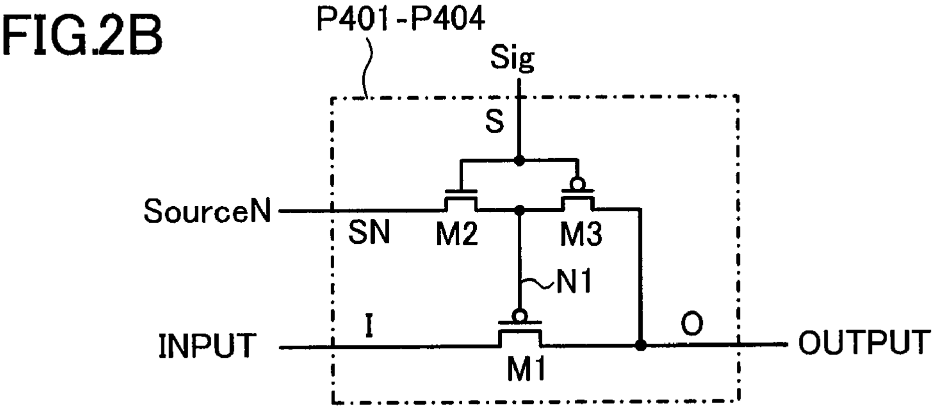

FIG. 2B shows a configuration of each of the backflow preventing cells P401-P404 included in the backflow preventing circuit ST4 of FIG. 1. The backflow preventing cells P401-P404 each have the configuration of each of the boosting cells P101-P104, P201-P204, and P301-P304 of FIG. 2A from which the boosting capacitor C1 is removed. The charge transfer transistor M1, the on-switch transistor M2, and the off-switch transistor M3 are each operated in a manner similar to that of the corresponding one in the boosting cell.

Figure 2C:
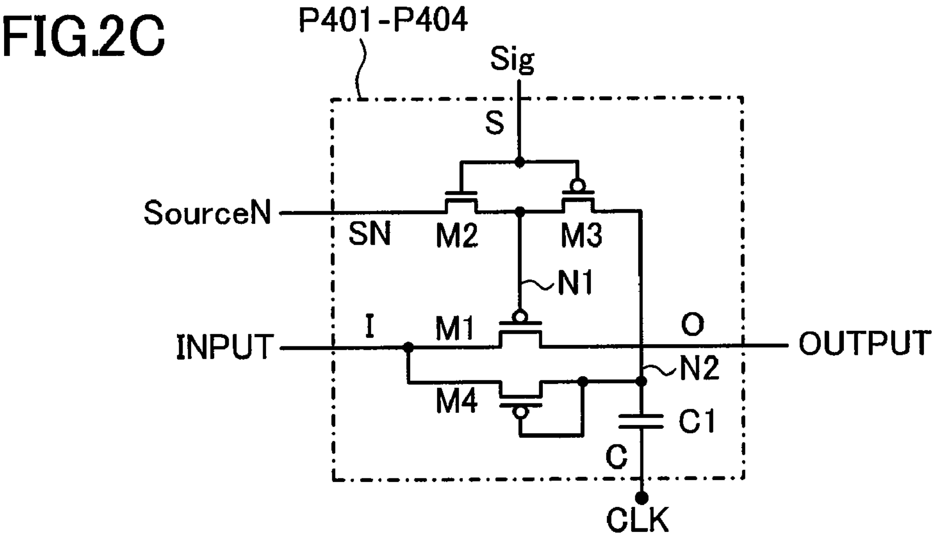

Note that the configuration of the backflow preventing cell of FIG. 2B is only for illustrative purposes. Any other configurations that provide a similar function may be used. For example, as shown in FIG. 2C, the source of the off-switch transistor M3 may be changed to an intermediate terminal N2 which is disconnected from the output terminal of the booster circuit 100. Also, the source of the off-switch transistor M3 may be connected to the boosting capacitor C1 whose voltage is boosted using a boosting signal and a diode-connected transistor M4 connected to the input terminal of the backflow preventing cell. In this case, a function similar to that of FIG. 2B can be obtained. Therefore, the present disclosure is not limited to the configuration of FIG. 2B, and any configuration which provides a function similar to that of the configuration of FIG. 2B may be used.

<Operation>

Figure 3:
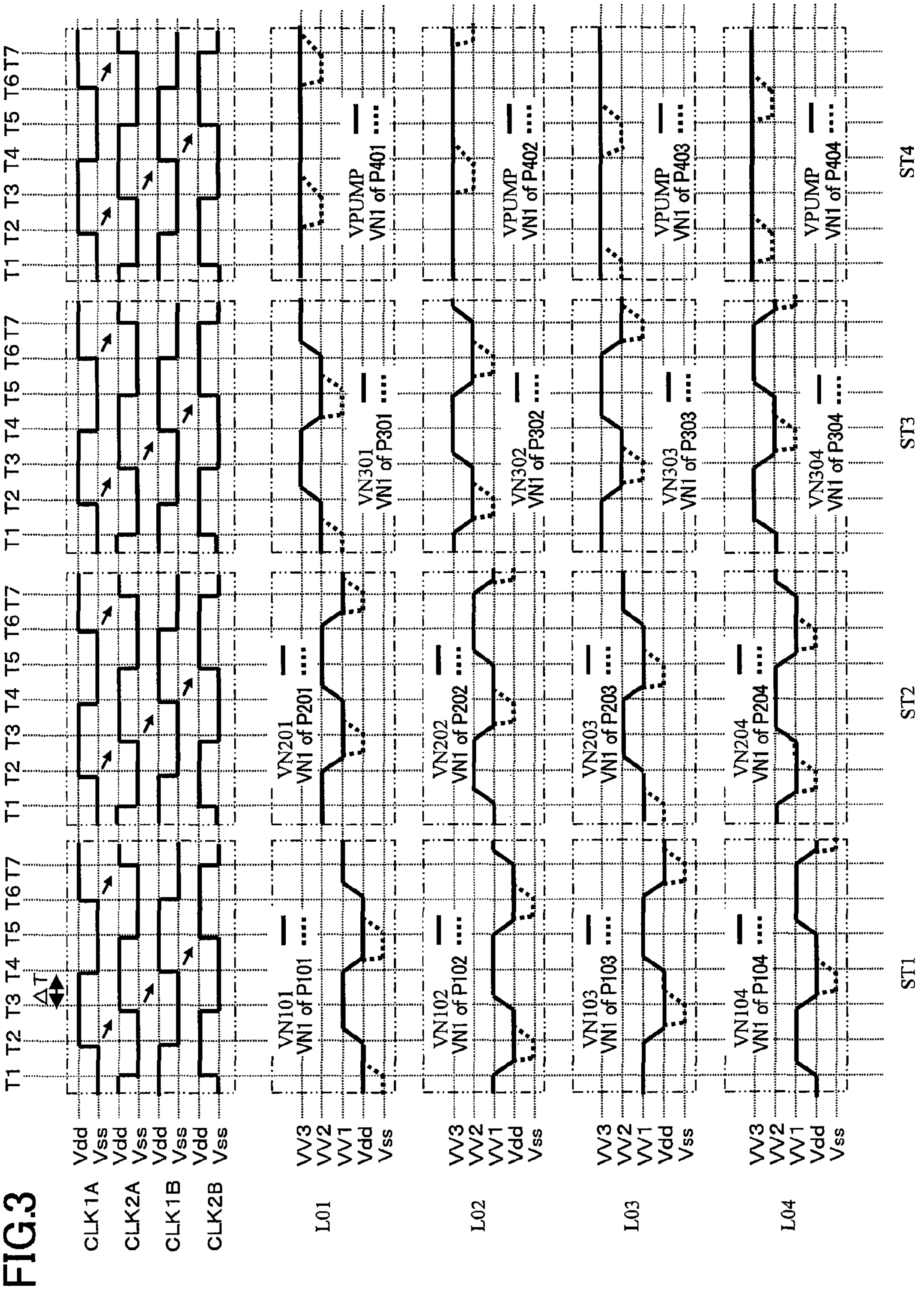
FIG. 3 is a waveform diagram for describing operation of the booster circuit of FIG. 1.
Figure 4A:
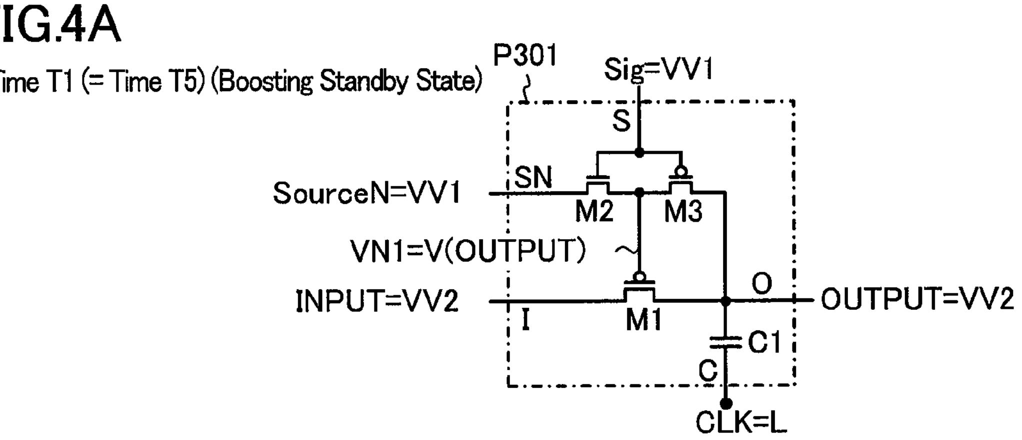
FIGS. 4A-4D are diagrams showing operating modes of the boosting cell for describing operation of the booster circuit of FIG. 1.
Figure 4B:
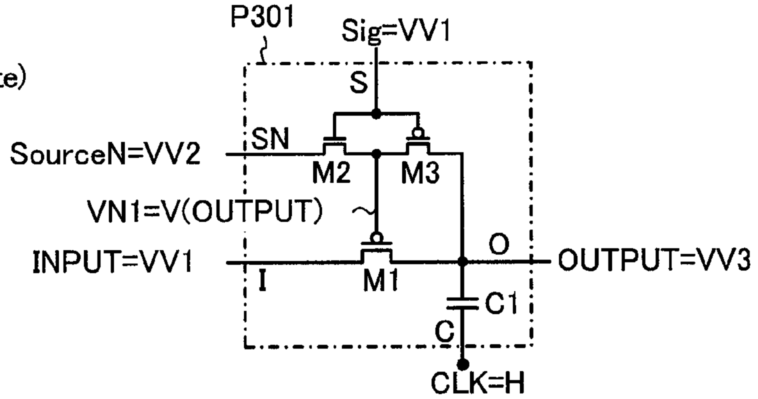
Figure 4C:
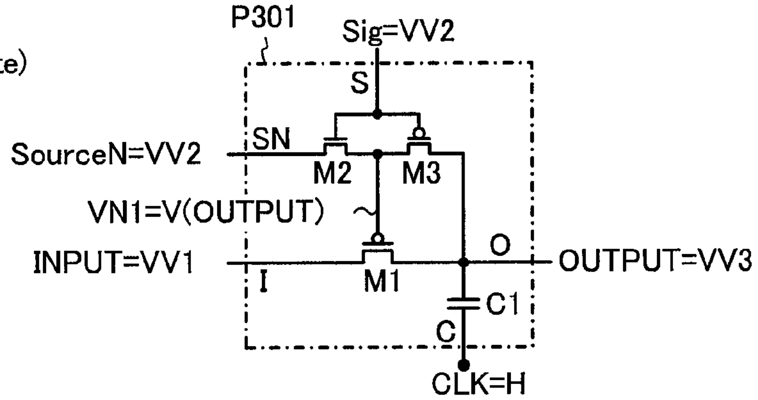
Figure 4D:
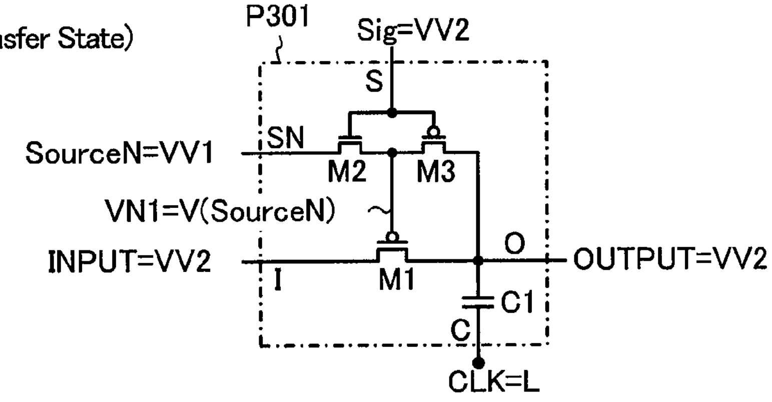

Next, operation of the booster circuit 100 of FIG. 1 will be described with reference to FIG. 3. Note that it is assumed that the amplitudes of the clock signals CLK1A, CLK2A, CLK1B, and CLK2B each vary between a power supply voltage Vdd and a ground voltage Vss, and the output terminal of the booster circuit 100 has neither a current load nor a voltage limit. In FIG. 3, VV1, VV2, and VV3 are as follows:

$$(VV1)=Vdd+\alpha\times Vdd$$

$$(VV2)=Vdd+2\alpha\times Vdd$$

$$(VV3)=Vdd+3\alpha Vdd$$

As shown in FIGS. 4A-4D, as a representative of the boosting cells P101-P104, P201-P204, and P301-P304, and the backflow preventing cell P401-P404, the boosting cell P301 is used to categorize operating modes of the boosting cell and the backflow preventing cell, and clearly show a relationship between and constraints on the voltages of the clock signal CLK, the output terminal OUTPUT of the boosting cell, the control signal Sig, and the source signal SourceN in each operating mode.

[Time T1]

Initially, at time T1, the voltage of the source signal SourceN of the on-switch transistor M2 in each of the boosting cell P101 in the boosting stage ST1 and the boosting cell P301 in the boosting stage ST3 of the boosting cell line L01 which perform boosting operation in accordance with the clock signal CLK1A is:

$$(CLK1A)=L=Vss$$

$$(VN203)=VV1$$

The control signal Sig is:

$$(CLK2A)=L=Vss$$

$$(VN204)=VV1$$

The input/output terminals N101 and N301 of the boosting cells P101 and P301 are set to:

$$(VN101)=Vdd$$

$$(VN301)=VV2$$

Therefore, in each of the boosting cells P101 and P301, the potential difference between the gate and source of the on-switch transistor M2 is:

$$(CLK2A)-(CLK1A)=Vss-Vss=0$$

$$(VN204)-(VN203)=VV1-VV1=0$$

On the other hand, the potential difference between the gate and source of the off-switch transistor M3 is:

$$(CLK2A)-(VN101)=Vss-Vdd=-\alpha\times Vdd$$

$$(VN204)-(VN301)=VV1-VV2=-\alpha\times Vdd$$

Therefore, the off-switch transistor M3 is in the conductive state.

Therefore, the voltages VN1 of the gates N1 of the charge transfer transistors M1 of the boosting cells P101 and P301 in the boosting cell line L01 are Vdd and VV2, respectively. The potential differences between the gates and sources of the charge transfer transistors M1 of the boosting cells P101 and P301 are:

$$(VN1\text{ of }P101)-(VN101)=Vdd-Vdd=0$$

$$(VN1\text{ of }P301)-(VN301)=VV2-VV2=0$$

Thus, the gate and source of the charge transfer transistor M1 of each of the boosting cells P101 and P301 are set to the same potential, and therefore, the charge transfer transistor M1 is in the non-conductive state.

Similarly, in each of the boosting cell P203 in the boosting stage ST2 of the boosting cell line L03 which perform boosting operation in synchronization with the clock signal CLK1A and the backflow preventing cell P403 in the backflow preventing circuit ST4 of the boosting cell line L03, the off-switch transistors M3 is in the conductive state, so that the gate and source of the charge transfer transistor M1 are set to the same potential, and therefore, the charge transfer transistor M1 is in the non-conductive state.

[Time T2]

Next, at time T2, the clock signal CLK1A transition from low to high. As a result, the voltages VN101 and VN301 of the input/output terminals N101 and N301 of the boosting cell P101 in the boosting stage ST1 and the boosting cell P301 in the boosting stage ST3 of the boosting cell line L01 are boosted to:

$$(VN101)=VV1$$

$$(VN301)=VV3$$

In this case, it is clear that, because the charge transfer transistors M1 of the boosting cells P101 and P301 have been set to the non-conductive state since time T1, the backflow of charge via the charge transfer transistors M1 does not occur.

The boosting cells P101 and P301 perform boosting operation in synchronization with the clock signal CLK1A, and at the same time, the clock signal CLK1B transitions from high to low, and therefore, the boosting cell P201 in the boosting stage ST2 and the backflow preventing cell P401 in the backflow preventing circuit ST4 of the boosting cell line L01 transition to the charge transfer state. The terminal voltages of the boosting cell P201 and the backflow preventing cell P401 are as follows.

The source signals SourceN of the boosting cell P201 and the backflow preventing cell P401 are:

$$(VN103)=Vdd$$

$$(VN303)=VV2$$

The control signals Sig of the boosting cell P201 and the backflow preventing cell P401 are:

$$(VN104)=VV1$$

$$(VN304)=VV3$$

The output voltages of the input/output terminal N201 of the boosting cell P201 and the booster circuit 100 are:

$$(VN201)=VV1$$

$$(VPUMP)=VV3$$

Therefore, the potential differences between the gates and sources of the on-switch transistors M2 in the boosting cell P201 and the backflow preventing cell P401 are:

$$(VN104)-(VN103)=VV1-Vdd=\alpha\times Vdd$$

$$(VN304)-(VN303)=VV3-VV2=\alpha\times Vdd$$

On the other hand, the potential differences between the gates and sources of the off-switch transistors M3 are:

$$(VN104)-(VN201)=VV1-VV1=0$$

$$(VN304)-(VPUMP)=VV3-VV3=0$$

Therefore, the on-switch transistors M2 transition to the conductive state.

As a result, the voltages VN1 of the gates N1 of the charge transfer transistors M1 in the boosting cells P201 and the backflow preventing cell P401 are Vdd and VV2, respectively. The potential differences between the gates and sources of the charge transfer transistors M1 in the boosting cell P201 and the backflow preventing cell P401 are:

$$(VN1 \text{ of } P201)-(VN201)=Vdd-VV1=-\alpha\times Vdd$$

$$(VN1 \text{ of } P401)-(VPUMP)=VV2-VV3=-\alpha\times Vdd$$

Therefore, the charge transfer transistors M1 in the boosting cell P201 and the backflow preventing cell P401 transition to the conductive state, i.e., the charge transfer state. As a result, charge on the input/output terminal N101 whose voltage has been boosted by the boosting cell P101 in the boosting stage ST1 is transferred via the boosting cell P201 in the boosting stage ST2 to the input/output terminal N201. Charge on the input/output terminal N301 whose voltage has been boosted by the boosting cell P301 in the boosting stage ST3 is transferred via the backflow preventing cell P401 in the backflow preventing circuit ST4 to the output terminal of the booster circuit 100, so that the output voltage VPUMP of the booster circuit 100 is increased.

The voltages of the input/output terminals N101-N301 in the boosting stages of the boosting cell line L01 are also supplied to the corresponding same boosting stages of the boosting cell line L02. As a result, the on-switch transistors M2 of the boosting cells P102 and P302 in the boosting cell line L02 transition to the non-conductive state, and the off-switch transistors M3 transition to the conductive state. As a result, as in the boosting cells P101 and P301 at time T1, the charge transfer transistors M1 of the boosting cells P102 and P302 in the boosting cell line L02 are set to the non-conductive state.

As described above, operation similar to that of the boosting cells P101 and P301 in the boosting cell line L01 at time T2 is performed in the boosting cell P203 and the backflow preventing cell P403 in the boosting cell line L03. Briefly, after the charge transfer transistors M1 of the boosting cell P203 and the backflow preventing cell P403 in the boosting cell line L03 are set to the non-conductive state at time T1, the voltage of the input/output terminal N203 of the boosting cell P203 is boosted at time T2. Charge on the input/output terminal N203 whose potential has been increased is transferred via the boosting cell P303 in the succeeding boosting stage ST3 to the input/output terminal N303. Charge on the input/output terminal N103 of the boosting cell P203 is input to the boosting cell P204 in the succeeding boosting cell line L04. Similarly, charge on the input/output terminal N303 of the backflow preventing cell P403 is input to the backflow preventing cell P404 in the succeeding boosting cell line L04. As a result, the off-switch transistors M3 of the boosting cell P204 and the backflow preventing cell P404 in the boosting cell line L04 are set to the conductive state, so that the charge transfer transistors M1 are set to the non-conductive state.

[Time T3]

Next, at time T3, the clock signal CLK2A transitions from low to high. As a result, the voltages VN102 and VN302 of the input/output terminals N102 and N302 of the boosting cell P102 in the boosting stage ST1 and the boosting cell P302 in the boosting stage ST3 of the boosting cell line L02 are boosted to:

$$(VN102)=VV1$$

$$(VN302)=VV3$$

In this case, it is clear that, because the charge transfer transistors M1 of the boosting cells P102 and P302 have been set to the non-conductive state since time T2, the backflow of charge via these charge transfer transistors M1 does not occur.

The boosting cells P102 and P302 perform boosting operation in synchronization with the clock signal CLK2A, and at the same time, the clock signal CLK2B transitions from high to low, so that the boosting cell P202 in the boosting stage ST2 and the backflow preventing cell P402 in the backflow preventing circuit ST4 of the boosting cell line L02 transition to the charge transfer state. The terminal voltages of the boosting cell P202 and the backflow preventing cell P402 are as follows.

The source signals SourceN of the boosting cell P202 and the backflow preventing cell P402 are:

$$(VN104)=Vdd$$

$$(VN304)=VV2$$

The voltages VN101 and VN301 of the input/output terminals N101 and N301 of the boosting cell P201 in the boosting stage ST2 and the backflow preventing cell P401 in the backflow preventing circuit ST4 of the boosting cell line L01 are:

$$(VN101)=VV1$$

$$(VN301)=VV3$$

The voltages of the input/output terminal N202 of the boosting cell P202 and the output terminal of the booster circuit 100 are:

$$(VN202)=VV1$$

$$(VPUMP)=VV3$$

Therefore, the potential differences between the gates and sources of the on-switch transistors M2 of the boosting cell P202 and the backflow preventing cell P402 in the boosting cell line L02 are:

$$(VN101)-(VN104)=VV1-Vdd=\alpha\times Vdd$$

$$(VN301)-(VN304)=VV3-VV2=\alpha\times Vdd$$

On the other hand, the potential differences between the gates and sources of the off-switch transistors M3 are:

$$(VN101)-(VN202)=VV1-VV1=0$$

$$(VN301)-(VPUMP)=VV3-VV3=0$$

Therefore, the on-switch transistors M2 transition to the conductive state.

As a result, the voltages VN1 of the gates N1 of the charge transfer transistors M1 in the boosting cell P202 and the backflow preventing cell P402 are Vdd and VV2, respectively, and the potential differences between the gates and sources of the charge transfer transistors M1 in the boosting cell P202 and the backflow preventing cell P402 are:

$$(VN1\text{ of }P202)-(VN202)=Vdd-VV1=-\alpha\times Vdd$$

$$(VN1\text{ of }P402)-(VPUMP)=VV2-VV3=-\alpha\times Vdd$$

Therefore, the charge transfer transistors M1 in the boosting cell P202 and the backflow preventing cell P402 transition to the conductive state, i.e., the charge transfer state. As a result, charge on the input/output terminal N102 whose voltage has been boosted by the boosting cell P102 in the boosting stage ST1 is transferred via the boosting cell P202 in the boosting stage ST2 to the input/output terminal N202. Charge on the input/output terminal N302 whose voltage has been boosted by the boosting cell P302 in the boosting stage ST3 is transferred via the backflow preventing cell P402 in the backflow preventing circuit ST4 to the output terminal of the booster circuit 100, so that the output voltage VPUMP of the booster circuit 100 is increased.

The voltages of the input/output terminals N102-N302 in the boosting stages of the boosting cell line L02 are also supplied to the corresponding same boosting stages of the boosting cell line L03. As a result, the on-switch transistors M2 of the boosting cells P103 and P303 in the boosting cell line L03 transition to the non-conductive state, and the off-switch transistors M3 transition to the conductive state. As a result, as in the boosting cells P102 and P302 at time T2, the charge transfer transistors M1 of the boosting cells P103 and P303 in the boosting cell line L03 are set to the non-conductive state.

As described above, operation similar to that of the boosting cells P102 and P302 in the boosting cell line L02 at time T3 is performed in the boosting cell P204 and the backflow preventing cell P404 in the boosting cell line L04. Briefly, after the charge transfer transistors M1 of the boosting cell P204 and the backflow preventing cell P404 in the boosting cell line L04 are set to the non-conductive state at time T2, the voltage of the input/output terminal N204 of the boosting cell P204 is boosted at time T3. Charge on the input/output terminal N204 whose potential has been increased is transferred via the boosting cell P304 in the succeeding boosting stage ST3 to the input/output terminal N304. Charge on the input/output terminal N104 of the boosting cell P204 is input to the boosting cell P201 in the succeeding boosting cell line L01. Similarly, charge on the input/output terminal N304 of the backflow preventing cell P404 is input to the backflow preventing cell P401 in the succeeding boosting cell line L01. As a result, the off-switch transistors M3 of the boosting cell P201 and the backflow preventing cell P401 in the boosting cell line L01 are set to the conductive state, so that the charge transfer transistors M1 are set to the non-conductive state.

[Time T4]

Next, at time T4, the clock signal CLK1B transitions from low to high. As a result, the voltages VN103 and VN303 of the input/output terminals N103 and N303 of the boosting cell P103 in the boosting stage ST1 and the boosting cell P303 in the boosting stage ST3 of the boosting cell line L03 are boosted. In this case, it is clear that, as in the foregoing cases, because the charge transfer transistors M1 of the boosting cells P103 and P303 have been set to the non-conductive state since time T3, the backflow of charge via the charge transfer transistors M1 does not occur.

Charge on the input/output terminal N103 of the boosting cell P103 whose potential has been increased is transferred via the boosting cell P203 in the succeeding boosting stage ST2 to the input/output terminal N203, and charge on the input/output terminal N303 of the boosting cell P303 is transferred via the backflow preventing cell P403 in the succeeding backflow preventing circuit ST4 to the output terminal of the booster circuit 100, so that the boosted voltage VPUMP is increased. The voltages of the input/output terminals N103-N303 in the boosting stages of the boosting cell line L03 are supplied to the corresponding same boosting stages of the succeeding boosting cell line L04. As a result, the on-switch transistors M2 of the boosting cell P104 and P304 in the boosting cell line L04 transition to the non-conductive state, and the off-switch transistors M3 transition to the conductive state. As a result, as in the boosting cells P103 and P303 at time T3, the charge transfer transistors M1 of the boosting cells P104 and P304 in the boosting cell line L04 are set to the non-conductive state.

As described above, operation similar to that of the boosting cells P103 and P303 in the boosting cell line L03 at time T4 is performed in the boosting cell P201 and the backflow preventing cell P401 in the boosting cell line L01. Briefly, after the charge transfer transistors M1 of the boosting cell P201 and the backflow preventing cell P401 in the boosting cell line L01 are set to the non-conductive state at time T3, the voltage of the input/output terminal N201 of the boosting cell P201 is boosted at time T4. Charge on the input/output terminal N201 whose potential has been increased is transferred via the boosting cell P301 in the succeeding boosting stage ST3 to the input/output terminal N301. Charge on the input/output terminal N101 of the boosting cell P201 is input to the boosting cell P202 in the succeeding boosting cell line L02. Similarly, charge on the input/output terminal N301 of the backflow preventing cell P401 is input to the backflow preventing cell P402 in the succeeding boosting cell line L02. As a result, the off-switch transistors M3 of the boosting cell P202 and the backflow preventing cell P402 in the boosting cell line L02 are set to the conductive state, so that the charge transfer transistors M1 are set to the non-conductive state.

[Time T5]

Next, at time T5, the clock signal CLK2B transitions from low to high. As a result, the voltages VN104 and VN304 of the input/output terminals N104 and N304 of the boosting cell P104 in the boosting stage ST1 and the boosting cell P304 in the boosting stage ST3 of the boosting cell line L04 are boosted. In this case, it is clear that, as in the foregoing cases, because the charge transfer transistors M1 of the boosting cells P104 and P304 have been set to the non-conductive state since time T4, the backflow of charge via the charge transfer transistors M1 does not occur.

Charge on the input/output terminal N104 of the boosting cell P104 whose potential has been increased is transferred via the boosting cell P204 in the succeeding boosting stage ST2 to the input/output terminal N204, and charge on the input/output terminal N304 of the boosting cell P304 is transferred via the backflow preventing cell P404 of the succeeding backflow preventing circuit ST4 to the output terminal of the booster circuit 100, so that the boosted voltage VPUMP is increased. The voltages of the input/output terminals N104-N304 in the boosting stages of the boosting cell line L04 which is the final line are supplied to the corresponding same boosting stages of the succeeding boosting cell line L01 (leading line). As a result, the on-switch transistors M2 of the boosting cells P101 and P301 in the boosting cell line L01 transition to the non-conductive state, and the off-switch transistors M3 transition to the conductive state. As a result, as in the boosting cells P104 and P304 at time T4, the charge transfer transistors M1 of the boosting cells P101 and P301 in the boosting cell line L01 are set to the non-conductive state.

As described above, operation similar to that of the boosting cells P104 and P304 in the boosting cell line L04 at time T5 is performed in the boosting cell P202 and the backflow preventing cell P402 in the boosting cell line L02. Briefly, after the charge transfer transistors M1 of the boosting cell P202 and the backflow preventing cell P402 in the boosting cell line L02 are set to the non-conductive state at time T4, the voltage of the input/output terminal N202 of the boosting cell P202 is boosted at time T5. Charge on the input/output terminal N202 whose potential has been increased is transferred via the boosting cell P302 in the succeeding boosting stage ST3 to the input/output terminal N302. Charge on the input/output terminal N102 of the boosting cell P202 is input to the boosting cell P203 in the succeeding boosting cell line L03. Similarly, charge on the input/output terminal N302 of the backflow preventing cell P402 is input to the backflow preventing cell P403 in the succeeding boosting cell line L03. As a result, the off-switch transistors M3 of the boosting cell P203 and the backflow preventing cell P403 in the boosting cell line L03 are set to the conductive state, so that the charge transfer transistors M1 are set to the non-conductive state.

By the transition at time T5, control returns to a state similar to that of time T1. Thus, boosting operation is repeated.

The operation of the booster circuit 100 has been described heretofore. As described above, all of the boosting cells P101-P104, P201-P204, and P301-P304 and the backflow preventing cells P401-P404 repeatedly perform operation of time T1-T4 to perform boosting operation. In a boosting cell to be operated, the charge transfer transistor M1 transitions from the conductive state to the non-conductive state (boosting standby state), and thereafter, boosting operation is performed (boosting state), and thereafter, charge is transferred from the preceding stage to the succeeding stage (charge transfer state). Thereafter, the boosting cell returns to the boosting standby state.

Therefore, the description of the boosting standby state, boosting state, and charge transfer state of a single boosting cell can encompass the operation of the other boosting cells and the backflow preventing cell.

Moreover, if conditions for the terminal voltages of the boosting cell or the backflow preventing cell in the boosting standby state, the boosting state, and the charge transfer state can be clearly shown, it can be shown that boosting operation can be performed, by indicating that the terminal voltage conditions are satisfied.

Therefore, as a representative example, the boosting cell P301 in the boosting stage ST3 of the boosting cell line L01 will be described with reference to FIGS. 3 and 4A-4D in terms of the clock signals to the boosting cell and the terminal voltage conditions in the boosting standby state, the boosting state, and the charge transfer state.

Initially, at time T1, the boosting cell P301 needs to cause the charge transfer transistor M1 to transition from the conductive state to the non-conductive state to be ready for boosting operation. In this case, the clock signal and the terminal voltages are:

clock signal CLK1A=L input terminal INPUT=VV2 output terminal OUTPUT=VV2 control signal Sig=VV1 (the voltage VN204 of the input/output terminal N204 of the boosting cell P304)

source signal SourceN=VV1 (the voltage VN203 of the input/output terminal N203 of the boosting cell P303)

Therefore, when the clock signal is low, the charge transfer transistor M1 is caused to be in the non-conductive state by:

1. causing the off-switch transistor M3 to be in the conductive state by satisfying $$V(\text{control signal Sig}) \leqq V(\text{OUTPUT}) - |Vtm3|, \text{ and}$$

2. causing the on-switch transistor M2 to be in the non-conductive state by satisfying $$V(\text{Source}N) \geqq V(\text{Sig}) - Vtm2$$

In this case, the voltages of the gate and source of the charge transfer transistor M1 can be equalized. Here, Vtm2 is the threshold voltage of the on-switch transistor M2, and |Vtm3| is the absolute value of the threshold voltage of the off-switch transistor M3.

Next, at time T2, the boosting cell P301 needs to maintain the charge transfer transistor M1 in the non-conductive state to perform boosting operation. In this case, the clock signal and the terminal voltages are:

clock signal CLK1A=H input terminal INPUT=VV1 output terminal OUTPUT=VV3 control signal Sig=VV1 (the voltage VN204 of the input/output terminal N204 of the boosting cell P304)

source signal SourceN=VV2 (the voltage VN203 of the input/output terminal N203 of the boosting cell P303)

Therefore, when the clock signal is high, the charge transfer transistor M1 is caused to be in the non-conductive state by:

1. causing the off-switch transistor M3 to be in the conductive state by satisfying $$V(\text{control signal Sig}) \leqq V(\text{OUTPUT}) - |Vtm3|, \text{ and}$$

2. causing the on-switch transistor M2 to be in the non-conductive state by satisfying $$V(\text{Source}N) \geqq V(\text{Sig}) - Vtm2$$

In this case, the voltages of the gate and source of the charge transfer transistor M1 can be equalized.

Next, at time T3, the boosting cell P301 needs to maintain the charge transfer transistor M1 in the non-conductive state to maintain boosting operation. In this case, the clock signal and the terminal voltages are:

clock signal CLK1A=H input terminal INPUT=VV1 output terminal OUTPUT=VV3 control signal Sig=VV2 (the voltage VN204 of the input/output terminal N204 of the boosting cell P304)

source signal SourceN=VV2 (the voltage VN202 of the input/output terminal N202 of the boosting cell P302)

Therefore, when the clock signal is high, the charge transfer transistor M1 is caused to be in the non-conductive state by:

1. causing the off-switch transistor M3 to be in the conductive state by satisfying $$V(\text{control signal Sig}) \leqq V(\text{OUTPUT}) - |\text{Vtm3}|, \text{ and}$$

2. causing the on-switch transistor M2 to be in the non-conductive state by satisfying $$V(\text{Source}N) \geqq V(\text{Sig}) - Vtm2$$

In this case, the voltages of the gate and source of the charge transfer transistor M1 can be equalized. Voltage conditions when the clock signal is high are the same as those of time T2.

Finally, at time T4, the boosting cell P301 needs to cause the charge transfer transistor M1 to transition from the non-conductive state to the conductive state, thereby transferring charge from the input terminal INPUT to the output terminal OUTPUT. In this case, the clock signal and the terminal voltages are:

clock signal CLK1A=L input terminal INPUT=VV2 output terminal OUTPUT=VV2 control signal Sig=VV2 (the voltage VN204 of the input/output terminal N204 of the boosting cell P304)

source signal SourceN=VV1 (the voltage VN203 of the input/output terminal N203 of the boosting cell P303)

Therefore, when the clock signal is low, the charge transfer transistor M1 is caused to be in the conductive state by:

1. causing the off-switch transistor M3 to be in the non-conductive state by satisfying $$V(\text{control signal Sig}) \geqq V(\text{OUTPUT}) - |Vtm3|, \text{ and}$$

2. causing the on-switch transistor M2 to be in the conductive state by satisfying $$V(\text{Source}N) \leqq V(\text{Sig}) - Vtm2$$

The states in boosting operation of the boosting cell and the backflow preventing cell are summarized in FIG. 5. The boosting operation states are: (1) the boosting standby state, (2) the boosting state, and (3) the charge transfer state. The clock signal and the terminal conditions are described in FIG. 5.

There are additional conditions: forbidding conditions and tolerance conditions. Firstly, as the forbidding conditions during transition of each operating state, there are voltage conditions under which the source signal SourceN and the output terminal OUTPUT cause a short circuit, so that charge flows backward from the succeeding stage to the preceding stage.

Forbidding Conditions:

$$V(\text{Source}N) \leqq V(\text{Sig}) - Vtm2; \text{ and}$$

$$V(\text{Sig}) \leqq V(\text{OUTPUT}) - |Vtm3|$$

During transition of operation, the gate N1 of the charge transfer transistor M1 transitions to the high impedance (HiZ) state. In this case, there are tolerance conditions under which the backflow of charge from an input/output terminal in the succeeding stage to an input/output terminal in the preceding stage does not occur.

Tolerance Conditions:

$$V(\text{Source}N) = V(\text{Sig}) = V(\text{OUTPUT})$$

The present disclosure is not limited to the connection of V(Sig) and V(SourceN) in this embodiment. Any connection of V(Sig) and V(SourceN) that satisfies the aforementioned conditions with respect to the clock signal to the boosting cell and the backflow preventing cell to be operated, can be used. In this case, it can be expected that, during boosting operation, the backflow of charge via the charge transfer transistor M1 can be reduced or prevented.

Note that the aforementioned configuration of the boosting cell and the backflow preventing cell is only for illustrative purposes. Any configuration that can perform a similar function may be used. The number of boosting stages is not limited to three and may be any number. The aforementioned example in which the number of boosting cell lines is four is also only for illustrative purposes. A similar advantage can be expected when the number of boosting cell lines is four or more.

In the boosting cells P201-P204, and P301-P304, and the backflow preventing cells P401-P404 provided in the corresponding same stages, the control terminal of the state controller including the on-switch transistor M2 and the off-switch transistor M3 is connected to the boosting cell in another line to form a ring connection. Here, the ring connection means that, for example, in the case of the boosting cells in the second stage, the input/output terminal N104 of the boosting cell P204 is connected to the control terminal of the state controller of the boosting cell P201, the input/output terminal N101 of the boosting cell P201 is connected to the control terminal of the state controller of the boosting cell P202, the input/output terminal N102 of the boosting cell P202 is connected to the control terminal of the state controller of the boosting cell P203, and the input/output terminal N103 of the boosting cell P203 is connected to the control terminal of the state controller of the boosting cell P204. Thus, the ring connection is a logical connection.

A perfect ring connection is not necessarily required. Any connection may be used if the charge transfer transistor of a boosting cell to be operated using the input terminal voltage of a boosting cell in a different line can be set from the conductive state to the non-conductive state, and thereafter, a series of operations which perform boosting operation with respect to the boosting cell to be operated can be repeatedly performed, although not shown. In this case, a similar advantage can be expected. For example, a boosting cell may be controlled by the input terminal voltage of a boosting cell in the immediately preceding line, and another boosting cell may be controlled by the input terminal voltage of the second preceding boosting cell. In this case, a similar advantage can be expected.

In the embodiments described below, it will be shown that boosting operation can be performed, by clearly showing conditions for terminal voltages of the boosting cell in the boosting standby state, the boosting state, and the charge transfer state, or the backflow preventing cell, and indicating that the terminal voltage conditions are satisfied.

<Advantages>

As described above, four clock signals are applied to four (M=4) boosting cell lines arranged in parallel. A boosting cell in the K-th line (1≦K≦M) is connected to the input terminal of a boosting cell in the (K−1)th line (when (K−1)=0, (K−1) is M) of the same stage. By performing a control by switching between the voltage of the output terminal of the boosting cell in the K-th line and the voltage of the input terminal of another boosting cell which is operated at a phase which is different by about 180 degrees from that of the boosting cell in the K-th line, depending on the voltage of the input terminal of the boosting cell in the (K−1)th line, the charge transfer transistor can be set to the non-conductive state during boosting operation without using a complicated clock. As a result, the decrease in boosting efficiency can be reduced or prevented.

The charge transfer transistor M1 used in the boosting cell and the backflow preventing cell may be configured using a P-channel transistor. Therefore, in this case, even when a twin-well CMOS process is employed, the substrate bias effect of the charge transfer transistor can be reduced or prevented, and the area of the booster circuit can be reduced by the reduction or prevention of the decrease in boosting efficiency.

Second Embodiment

<Configuration>

Figure 6:
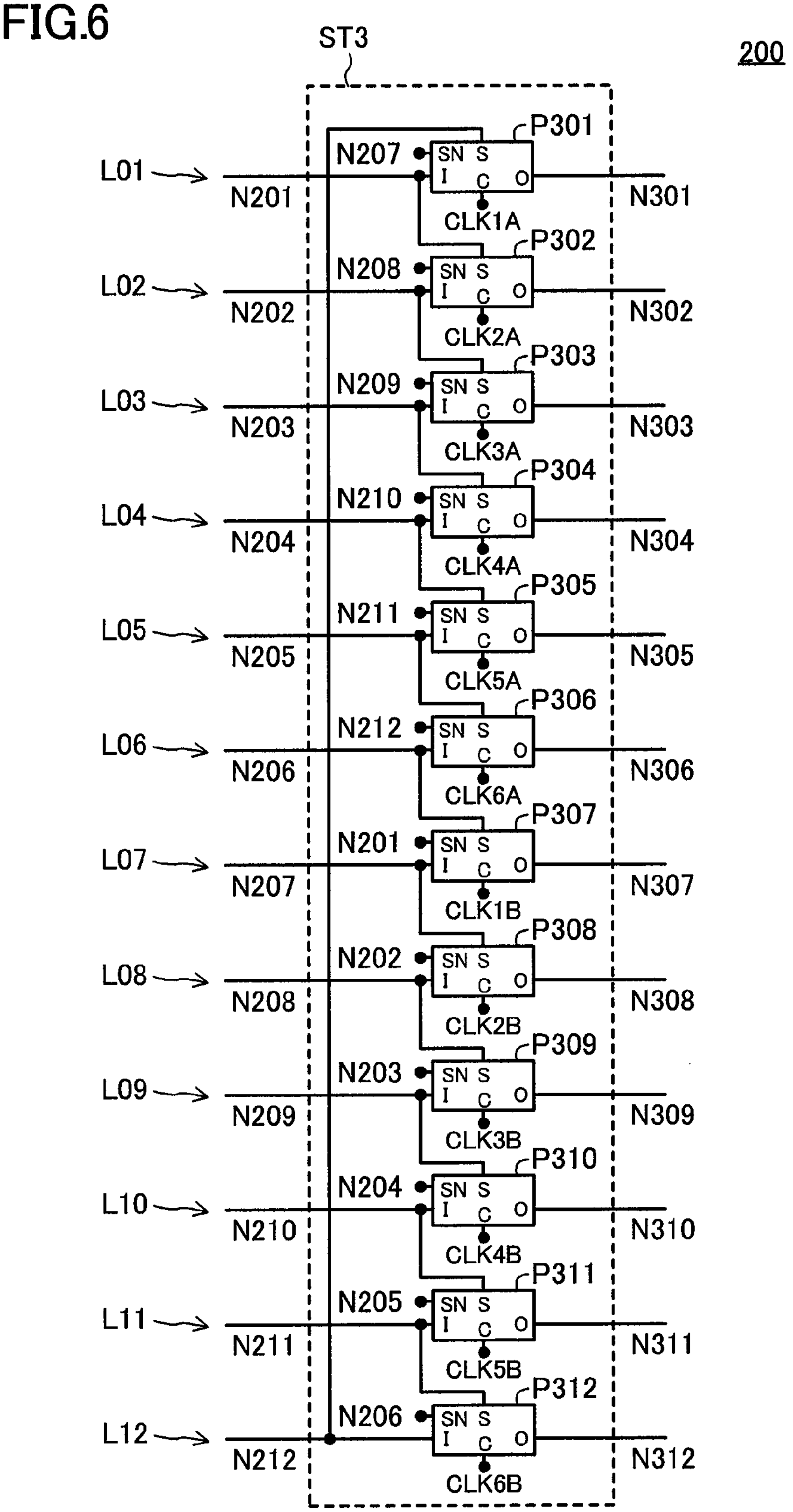
FIG. 6 is a block diagram showing a configuration of a booster circuit according to a second embodiment of the present disclosure.

FIG. 6 shows a booster circuit 200 according to a second embodiment of the present disclosure. FIG. 6 shows a circuit block corresponding to the third boosting stage ST3 in the booster circuit 100 of FIG. 1. The circuit block of FIG. 6 is different from the third boosting stage ST3 in the booster circuit 100 in that the number of boosting cell lines is changed from 4 to 12, specifically, boosting cell lines L01-L12 and boosting cells P301-P312 are provided. Therefore, the boosting cells P301-P312 are provided with input/output terminals N201-N212 and N301-N312. The boosting cells P301-P312 repeatedly perform boosting operation in synchronization with clock signals CLK1A-CLK6A and CLK1B-CLK6B. A boosting cell line in which boosting operation is performed in synchronization with the clock signal CLK1A is assumed to be the first line (L01), boosting cell lines in which boosting operation is performed in synchronization with the clock signals CLK2A-CLK6A are assumed to be the second to sixth lines (L02-L06), respectively, and boosting cell lines in which boosting operation is performed in synchronization with the clock signals CLK1B-CLK6B are assumed to be the seventh to twelfth lines (L7-L12), respectively. Note that the clock signals CLK1A and CLK1B have complementary amplitudes. Similarly, pairs of CLK2A and CLK2B, CLK3A and CLK3B, CLK4A and CLK4B, CLK5A and CLK5B, and CLK6A and CLK6B each have the complementary relationship.

Figure 8:
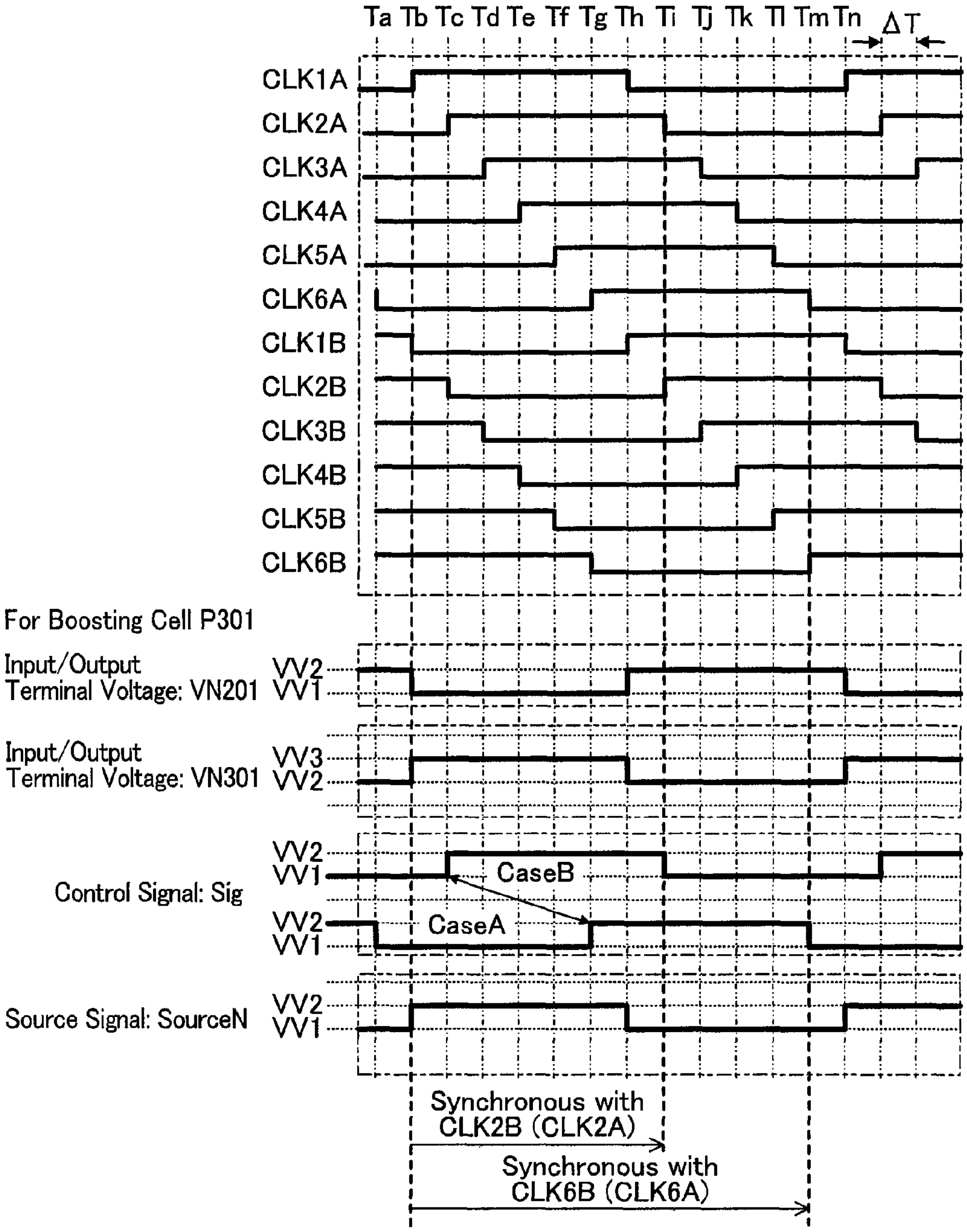
FIG. 8 is a waveform diagram for describing operation of the booster circuits of FIGS. 6 and 7.

FIG. 8 shows operating waveforms of the booster circuit 200 including the 12 lines. Because, as described in the first embodiment, the boosting cells and the backflow preventing cells have similar operating states, the boosting cell P301 which repeatedly performs boosting operation in synchronization with the clock signal CLK1A is used as a representative example to describe operation of the booster circuit 200. Here, a control signal Sig indicated by CaseA in FIG. 8 is used. The control signal Sig is the voltage of the input/output terminal N212 of the boosting cell P312 in the boosting cell line L12, and a source signal SourceN is the voltage of the input/output terminal N207 of the boosting cell P307 in the boosting cell line L07.

Note that, in the booster circuit 200 including the M boosting cell lines (M=12), the boosting cell in the K-th line (1≦K≦M) are connected to the input/output terminal (N201-N212) of the boosting cell (P301-P312) in the (K−1)th line (when (K−1)=0, (K−1) is M). The boosting cell in the K-th line performs boosting operation by switching between the voltage of the output terminal OUTPUT of the boosting cell in the K-th line and the voltage of the input terminal of the boosting cell in the KB-th line which is operated at a phase which is different by about 180 degrees from that of the boosting cell in the K-th line (KB=(M/2+K) when K≦M/2, and KB=(K−M/2) when K>M/2), depending on the voltage of the input/output terminal (N201-N212) of the boosting cell (P301-P312) in the (K−1)th line.

<Operation>

As described in the first embodiment with reference to FIG. 5, the operating states of the boosting cell P301 of the booster circuit 200 synchronous with the clock signal CLK1A can be categorized as the boosting standby state, the boosting state, and the charge transfer state using the operating waveforms (control signal: Sig is CaseA) of FIG. 8.

At time Ta, the clock signal CLK1A=L, and:

$$V(\text{control signal Sig})=VV1<V(\text{OUTPUT})=VV2$$

$$V(\text{Source}N)=VV1=V(\text{Sig})=VV1$$

Therefore, at time Ta, the boosting cell P301 is in the boosting standby state.

Next, at time Tb, CLK1A=H, and:

$$V(\text{control signal Sig})=VV1<V(\text{OUTPUT})=VV3$$

$$V(\text{Source}N)=VV2>V(\text{Sig})=VV1$$

Therefore, at time Tb, the boosting cell P301 is in the boosting state.

At time Tg, the clock signal CLK6B transitions from high to low, and:

$$V(\text{control signal Sig})=VV2<V(\text{OUTPUT})=VV3$$

$$V(\text{Source}N)=VV2=V(\text{Sig})=VV2$$

Therefore, the boosting cell P301 is maintained in the boosting state.

Next, at time Th, the clock signal CLK1A transitions from high to low, and:

$$V(\text{control signal Sig})=VV2=V(\text{OUTPUT})=VV2$$

$$V(\text{Source}N)=VV1<V(\text{Sig})=VV2$$

Therefore, the boosting cell P301 transitions to the charge transfer state.

Next, at time Tm, the boosting cell P301 transitions to the boosting standby state, which is the same state as that of time Ta.

In this case, the time required for charge transfer is (clock signal cycle×5/12), which is longer than the charge transfer time (=clock signal cycle/4) in the first embodiment, resulting in a reduction or prevention of an increase in the layout size of the charge transfer transistor.

Although the example in which 12 boosting cell lines are arranged in parallel has been described, a similar advantage can be expected if four or more boosting cell lines arranged in parallel are provided (the case of the four lines is described in the first embodiment). Also, the number of boosting stages in the booster circuit 200 is not limited to three and may be any number.

<Advantages>

By increasing the number of boosting cell lines, the charge transfer time can be increased, whereby the increase in the layout size of the charge transfer transistor can be reduced or prevented.

Third Embodiment

<Configuration>

Figure 7:
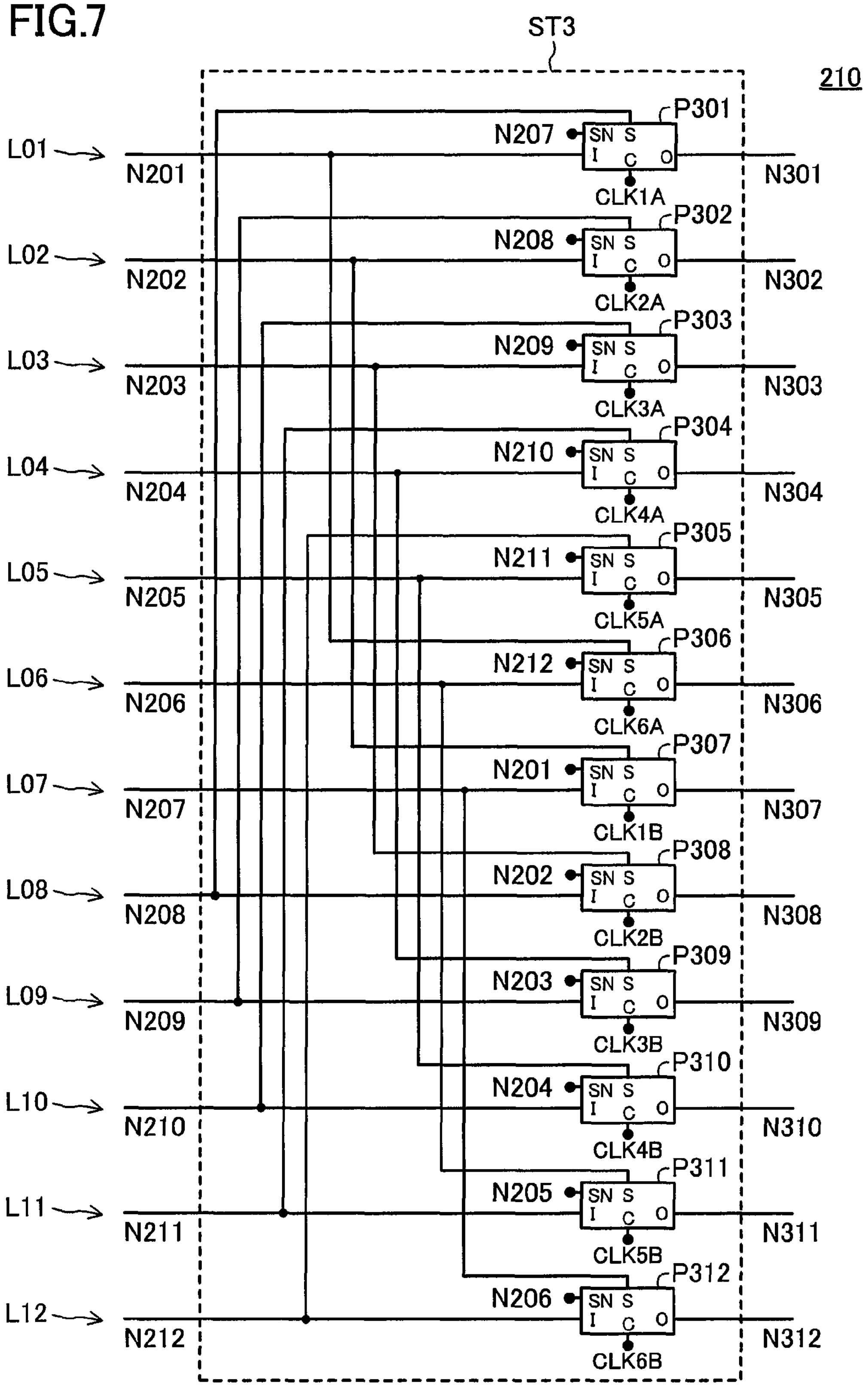
FIG. 7 is a block diagram showing a configuration of a booster circuit according to a third embodiment of the present disclosure.

FIG. 7 shows a booster circuit 210 according to a third embodiment of the present disclosure. The booster circuit 210 of FIG. 7 is a variation of the booster circuit 200 of FIG. 6. The booster circuit 210 is different from the booster circuit 200 in that the input/output terminal N208 of the boosting cell P308 in the boosting cell line L08 which repeatedly performs boosting operation in synchronization with the clock signal CLK2B (CLK2A) is connected to the control signal Sig of the boosting cell P301 (the control signal Sig is one indicated by CaseB in FIG. 8).

In the M boosting cell lines (M=12) arranged in parallel, the boosting cell in the K-th line (1≦K≦M) performs boosting operation by switching the voltage of the output terminal OUTPUT of the boosting cell of the K-th line and the voltage of the input terminal of a boosting cell which is operated at a phase which is different by about 180 degrees from that of the boosting cell of the K-th line, depending on the voltage of the input/output terminal (N201-N212) of the boosting cell (P301-P312) in the KA-th line which is the A-th preceding line from the K-th line (A=M/2−1=5, and KA=(K−A) when (K−A)>0, and KA=(M−|K−A|) when (K−A)≦0).

Note that, as in the second embodiment, the boosting cell P301 which repeatedly performs boosting operation in synchronization with the clock signal CLK1A is used as a representative example to describe operation of the booster circuit 210.

<Operation>

As described in the first embodiment with reference to FIG. 5, the operating states of the boosting cell P301 of the booster circuit 210 synchronous with the clock signal CLK1A can be categorized as the boosting standby state, the boosting state, and the charge transfer state using the operating waveforms (control signal: Sig is CaseB) of FIG. 8.

At time Ta, the clock signal CLK1A=L, and:

$$V(\text{control signal Sig})=VV1<V(\text{OUTPUT})=VV2$$

$$V(\text{Source}N)=VV1=V(\text{Sig})=VV1$$

Therefore, at time Ta, the boosting cell P301 is in the boosting standby state.

Next, at time Tb, CLK1A=H, and:

$$V(\text{control signal Sig})=VV1<V(\text{OUTPUT})=VV3$$

$$V(\text{Source}N)=VV2>V(\text{Sig})=VV1$$

Therefore, at time Tb, the boosting cell P301 is in the boosting state.

At time Tg, the clock signal CLK6B transitions from high to low, and:

$$V(\text{control signal Sig})=VV2<V(\text{OUTPUT})=VV3$$

$$V(\text{Source}N)=VV2=V(\text{Sig})=VV2$$

Therefore, the boosting cell P301 is maintained in the boosting state.

Next, at time Th, the clock signal CLK1A transitions from high to low, and:

$$V(\text{control signal Sig})=VV2=V(\text{OUTPUT})=VV2$$

$$V(\text{Source}N)=VV1<V(\text{Sig})=VV2$$

Therefore, the boosting cell P301 transitions to the charge transfer state.

Next, at time Tm, the boosting cell P301 transitions to the boosting standby state, which is the same state as that of time Ta.

Therefore, it can be seen that the charge transfer time is as short as (clock signal cycle×1/12), i.e., the charge transfer time is reduced.

According to the second and third embodiments, the control signal Sig of the boosting cell P301 which performs boosting operation in synchronization with the clock signal CLK1A can be connected to the input terminals INPUT of the boosting cells P312, P310, and P308 which perform boosting operation in synchronization with the clock signals CLK6B, CLK4B, and CLK2B, respectively. The charge transfer time can be adjusted within the range of (clock signal cycle×1/12) to (clock signal cycle×5/12) (the voltage conditions for a boosting cell described in the first embodiment are satisfied).

Specifically, in the M boosting cell lines (M≧4) arranged in parallel, the charge transfer transistor M1 of the boosting cell in the K-th line (1≦K≦M) can be controlled, depending on the voltage of the input terminal INPUT of the boosting cell in the KA-th line which is the A-th preceding line from the K-th line (1≦A≦M/2−1, and KA=(K−A) when (K−A)>0, and KA=(M−|K−A|) when (K−A)≦0). The charge transfer time can be adjusted under the predetermined constraint.

As the number M of boosting cell lines increases, the time difference ΔT between clock signals decreases, and the time required for transition from the boosting standby state to the boosting state decreases. As a result, the problem that it is difficult to substantially set the charge transfer transistor M1 to the non-conductive state is solved by arbitrarily changing the input terminal of a boosting cell to which the control signal Sig is connected (setting A) to set an optimum boosting standby state time and a sufficient charge transfer time.

Note that even when, as in the third embodiment, the control terminal of the state controller of a boosting cell is connected to the input terminal of another boosting cell in the same stage which is located in an n-th preceding line (n>1) instead of the first-preceding line, a ring connection is formed as in the first embodiment. Here, the ring connection means that, in the case of the boosting cells in the third stage, the input/output terminal N208 of the boosting cell P308 is connected to the control terminal of the state controller of the boosting cell P301, the input/output terminal N209 of the boosting cell P309 is connected to the control terminal of the state controller of the boosting cell P302, the input/output terminal N210 of the boosting cell P310 is connected to the control terminal of the state controller of the boosting cell P303, the input/output terminal N211 of the boosting cell P311 is connected to the control terminal of the state controller of the boosting cell P304, the input/output terminal N212 of the boosting cell P312 is connected to the control terminal of the state controller of the boosting cell P305, the input/output terminal N201 of the boosting cell P301 is connected to the control terminal of the state controller of the boosting cell P306, the input/output terminal N202 of the boosting cell P302 is connected to the control terminal of the state controller of the boosting cell P307, the input/output terminal N203 of the boosting cell P303 is connected to the control terminal of the state controller of the boosting cell P308, the input/output terminal N204 of the boosting cell P304 is connected to the control terminal of the state controller of the boosting cell P309, the input/output terminal N205 of the boosting cell P305 is connected to the control terminal of the state controller of the boosting cell P310, the input/output terminal N206 of the boosting cell P306 is connected to the control terminal of the state controller of the boosting cell P311, and the input/output terminal N207 of the boosting cell P307 is connected to the control terminal of the state controller of the boosting cell P312.

Thus, a configuration in which the control terminal of the state controller is connected to the input terminal of the boosting cell which is located in an n-th logically preceding line (n>1), and the connection pattern is repeatedly provided, is defined as the ring connection.

<Advantages>

In the M boosting cell lines (M≧4) arranged in parallel, the control signal Sig of a boosting cell in the K-th line is connected to the input terminal INPUT of a boosting cell in the A-th preceding line (1≦A≦M/2−1), whereby an optimum boosting standby state time and a sufficient charge transfer time can be set with respect to the charge transfer transistor M1.

Fourth Embodiment

<Configuration>

Figure 9:
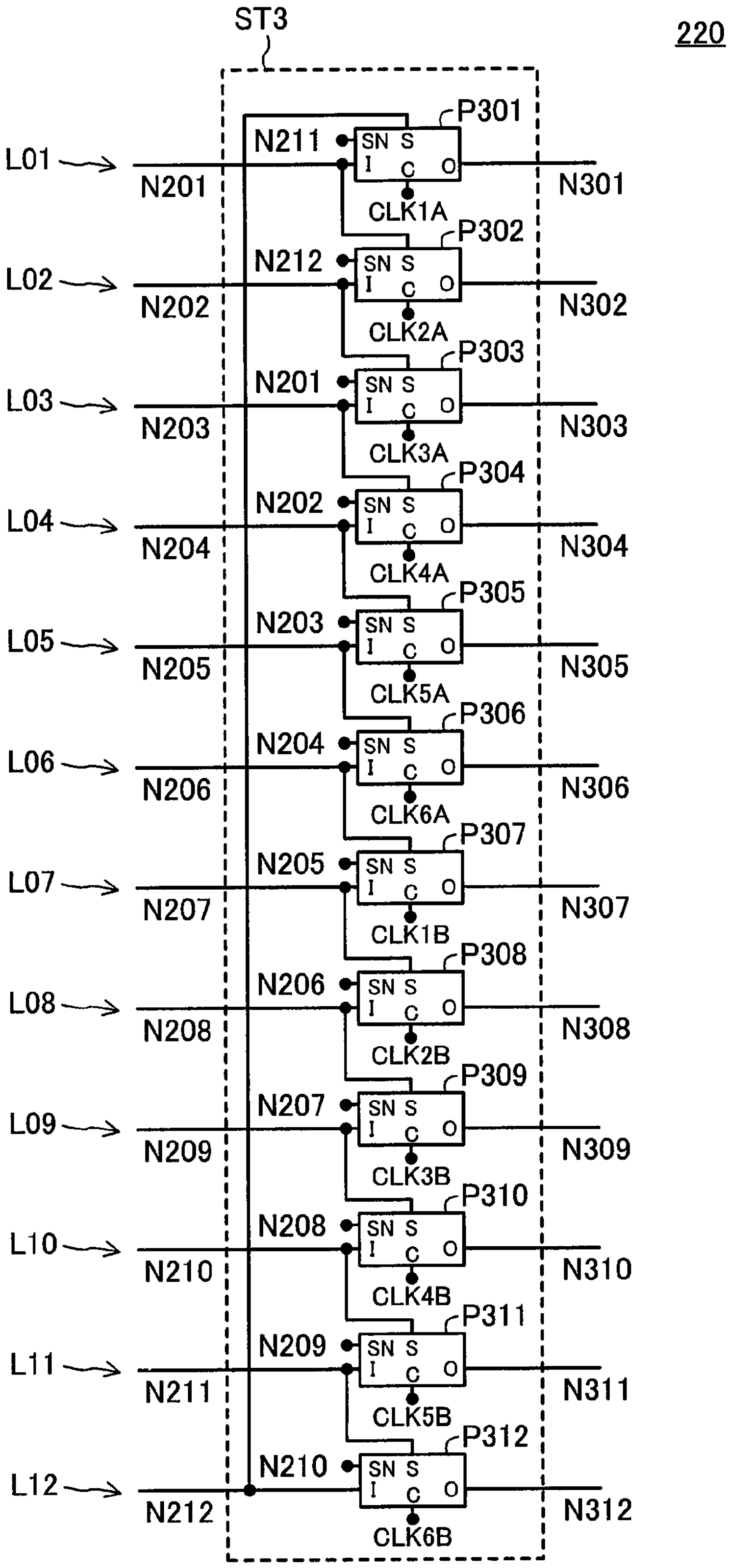
FIG. 9 is a block diagram showing a configuration of a booster circuit according to a fourth embodiment of the present disclosure.

FIG. 9 shows a booster circuit 220 according to a fourth embodiment of the present disclosure. The booster circuit 220 of FIG. 9 is a variation of the booster circuit 200 of FIG. 6. The booster circuit 220 is different from the booster circuit 200 in that the input/output terminal N211 of the boosting cell P311 in the boosting cell line L11 which performs boosting operation in synchronization with the clock signal CLK5B is connected to the source signal SourceN of the boosting cell P301.

In the M boosting cell lines (M=12) arranged in parallel, the source signal SourceN of a boosting cell in the K-th line (1≦K≦M) may be connected to the input terminal INPUT of a boosting cell in the KB-th line which is the B-th preceding line from the K-th line (A<B≦M/2: A is the value described in the third embodiment, and KB=(K−B) when (K−B)>0, and KB=(M−|K−B|) when (K−B)≦0). In the booster circuit 220, it is assumed that B=2, for example.

<Operation>

Figure 10:
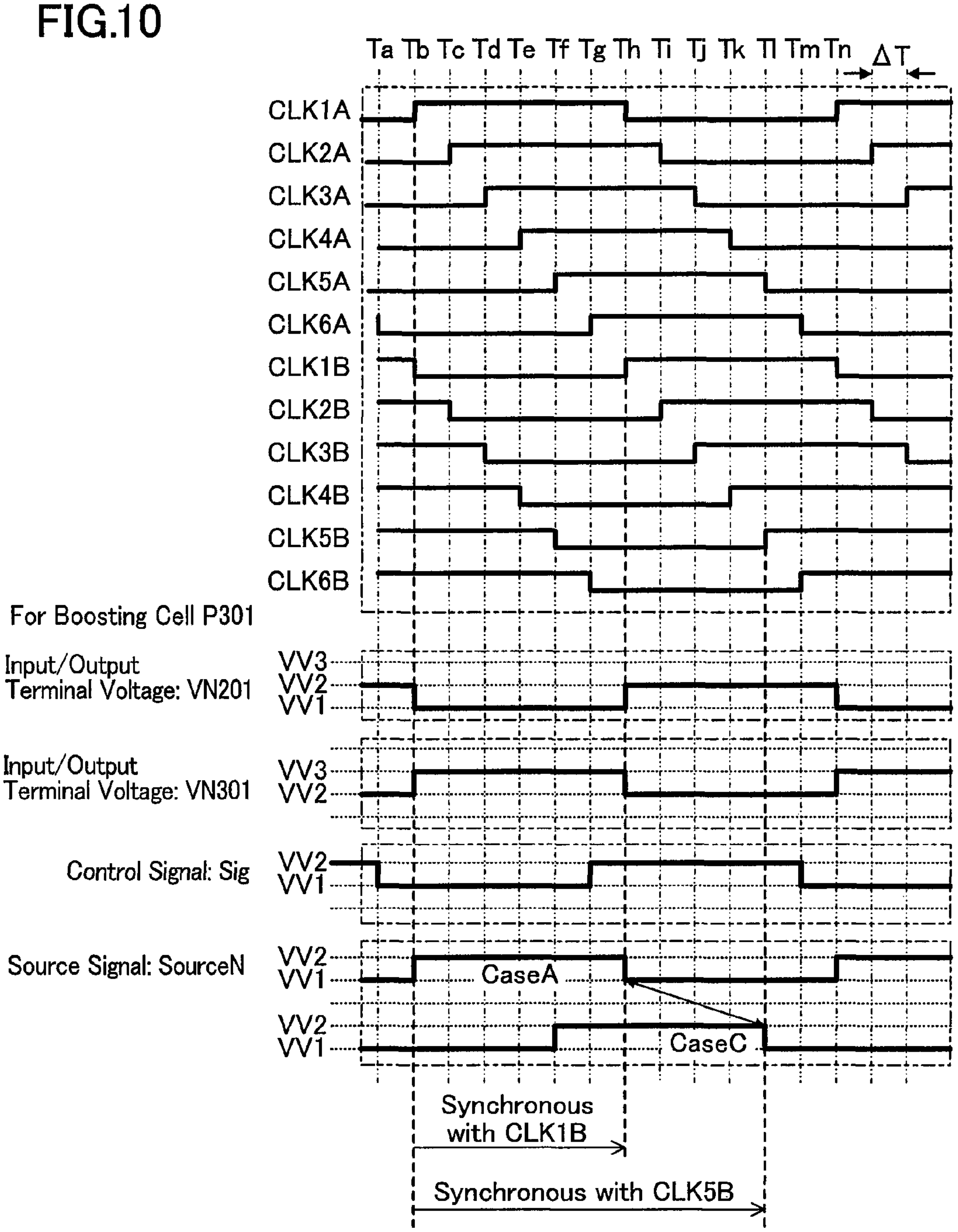
FIG. 10 is a waveform diagram for describing operation of the booster circuit of FIG. 9.

As described in the first embodiment with reference to FIG. 5, the operating states of the boosting cell P301 of the booster circuit 220 synchronous with the clock signal CLK1A can be categorized as the boosting standby state, the boosting state, and the charge transfer state using operating waveforms (the source signal SourceN is CaseC) of FIG. 10.

Note that CaseA in FIG. 10 indicates the operating waveform of the booster circuit 200 described in the second embodiment.

At time Ta, the clock signal CLK1A=L, and:

$$V(\text{control signal Sig})=VV1<V(\text{OUTPUT})=VV2$$

$$V(\text{Source}N)=VV1=V(\text{Sig})=VV1$$

Therefore, at time Ta, the boosting cell P301 is in the boosting standby state.

Next, at time Tb, CLK1A=H, and:

$$V(\text{control signal Sig})=VV1<V(\text{OUTPUT})=VV3$$

$$V(\text{Source}N)=VV1=V(\text{Sig})=VV1$$

Therefore, at time Tb, the boosting cell P301 is in the boosting state.

At time Tf, the clock signal CLK5B transitions from high to low, and:

$$V(\text{control signal Sig})=VV1<V(\text{OUTPUT})=VV3$$

$$V(\text{Source}N)=VV2>V(\text{Sig})=VV1$$

Therefore, the boosting cell P301 is maintained in the boosting state.

Next, at time Th, the clock signal CLK1A transitions from high to low, and:

$$V(\text{control signal Sig})=VV2=V(\text{OUTPUT})=VV2$$

$$V(\text{Source}N)=VV2=V(\text{Sig})=VV2$$

Therefore, the gate N1 of the charge transfer transistor M1 transitions to the HiZ state. Despite this, the backflow of charge from the boosting cell in the succeeding stage to the boosting cell in the preceding stage does not occur.

Next, at time T1, the clock signal CLK5B transitions from low to high, and:

$$V(\text{the control signal Sig})=VV2=V(\text{OUTPUT})=VV2$$

$$V(\text{Source}N)=VV1<V(\text{Sig})=VV2$$

Therefore, the boosting cell P301 transitions to the charge transfer state.

Next, at time Tm, the boosting cell P301 transitions to the boosting standby state, which is the same state as that of time Ta.

Therefore, the gate N1 of the charge transfer transistor M1 transitions to the HiZ state before the charge transfer state. Despite this, the backflow of charge from the boosting cell in the succeeding stage to the boosting cell in the preceding stage via the charge transfer transistor M1 does not occur.

According to the second and fourth embodiments, the source signal SourceN of the boosting cell P301 which performs boosting operation in synchronization with the clock signal CLK1A can be connected to the input terminals INPUT of the boosting cells which perform boosting operation in synchronization with the clock signals CLK5B, CLK3B, and CLK1B (the voltage conditions for a boosting cell described in the first embodiment are satisfied).

The clock signal CLK5B is used to drive the second preceding boosting cell line from CLK1A, and the clock signal CLK1B is used to drive the sixth preceding boosting cell line from CLK1A. When the shift amount of a clock signal from CLK1A is represented by B, CLK5B is A=2 and CLK2B=6=M/2.

Here, in order to satisfy the voltage conditions of FIG. 5, the source signal SourceN needs to be synchronous with an n-th boosting cell line (n≧1) from the control signal Sig.

Thus, in the M boosting cell lines (M≧4) arranged in parallel, the boosting cell in the K-th line (1≦K≦M) can repeatedly perform boosting operation by switching between the voltage of the output terminal OUTPUT of the boosting cell in the K-th line and the voltage of the input terminal INPUT of the boosting cell in the KB-th line which is the B-th preceding line from the K-th line (A+1≦B≦M/2, and KB=(K−B) when (K−B)>0, and (M−|K−B|) when (K−B)≦0), depending on the voltage of the input terminal INPUT of the boosting cell in the KA-th line which is the A-th preceding line from the K-th line (1≦A≦M/2−1, and KA=(K−A) when (K−A)>0, and KA=(M−|K−A|) when (K−A)≦0).

<Advantages>

In the M boosting cell lines (M≧4) arranged in parallel, the boosting cell in the K-th line (1≦I≦M) can perform boosting operation while reducing or preventing the backflow via the charge transfer transistor.

Fifth Embodiment

Figure 11:
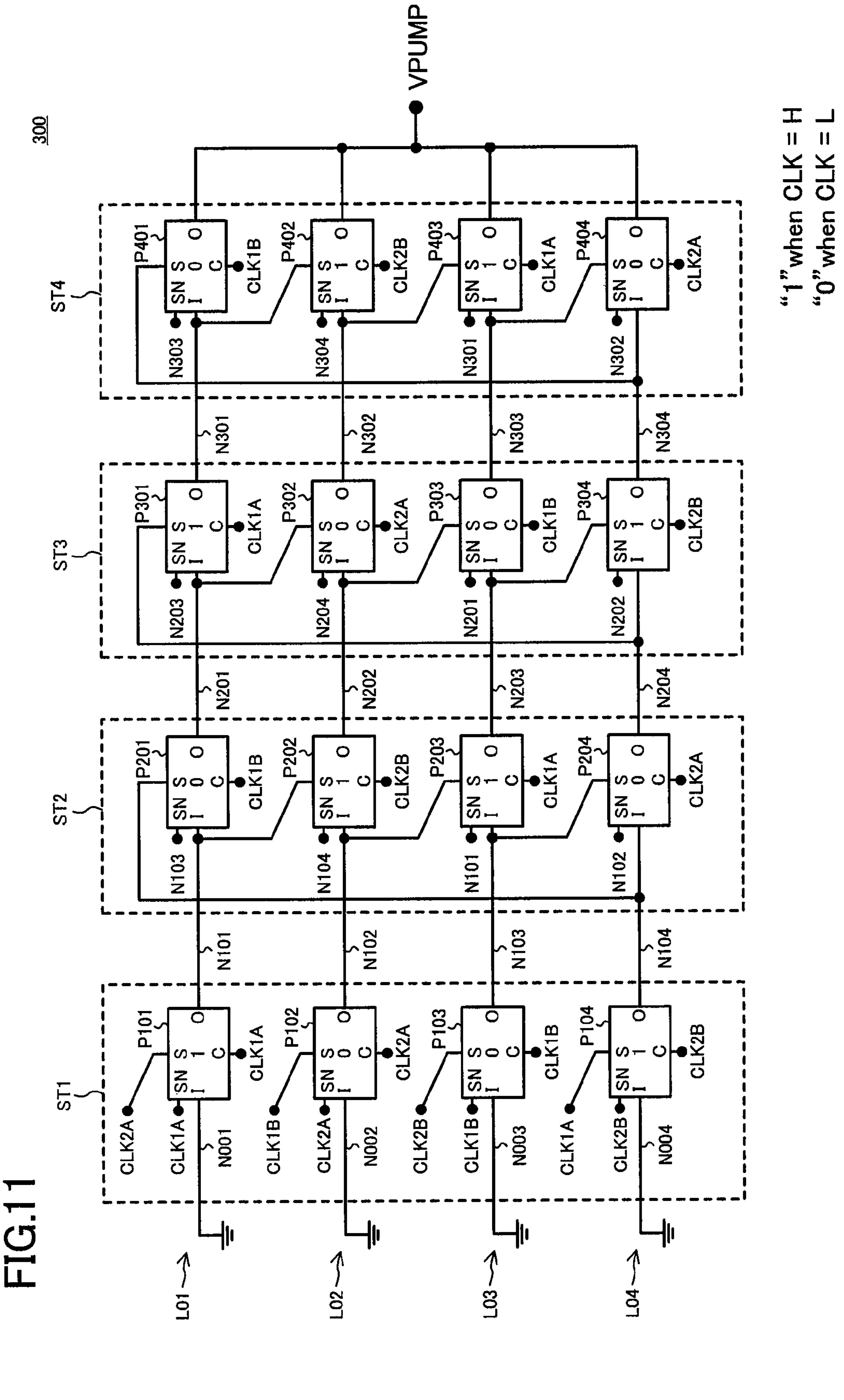
FIG. 11 is a block diagram showing a configuration of a booster circuit according to a fifth embodiment of the present disclosure.
Figure 12A:
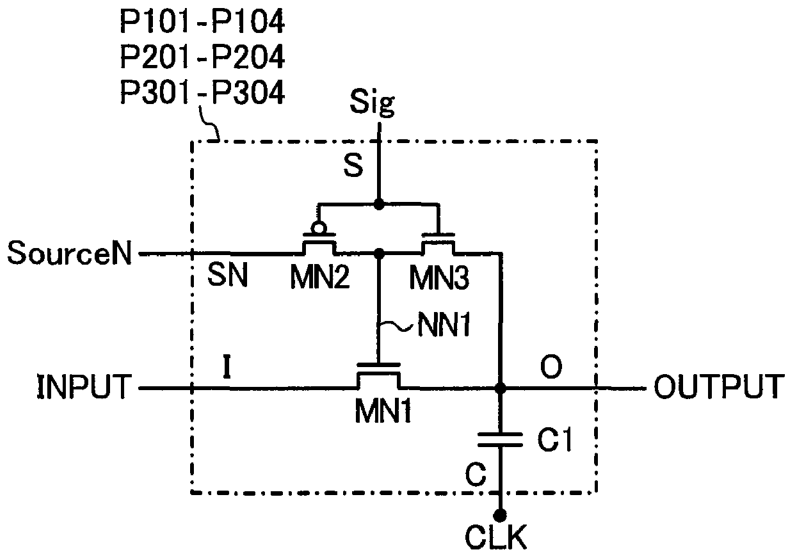
FIGS. 12A-12C are circuit diagrams showing configurations of a boosting cell and a backflow preventing cell of FIG. 11.
Figure 12B:
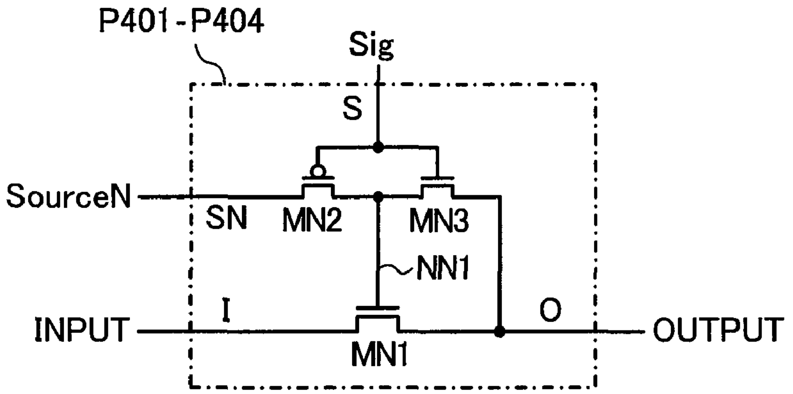
Figure 12C:
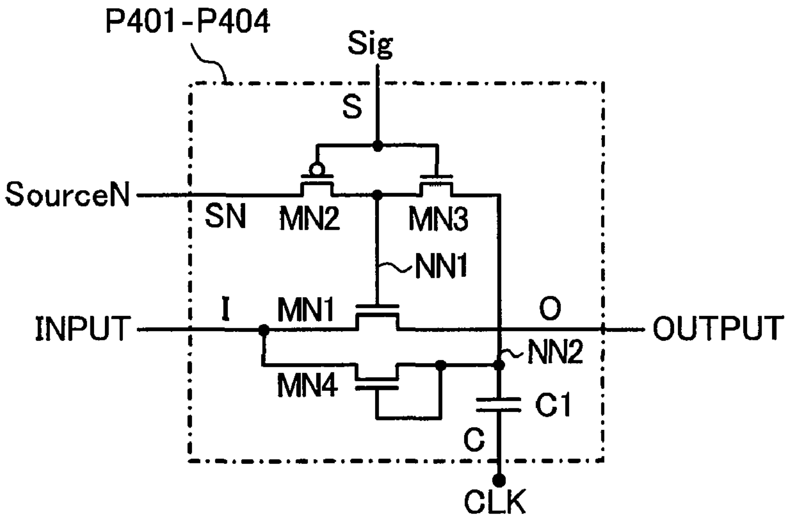

In the aforementioned embodiments, for example, the booster circuit 100 receives a power supply voltage to generate a positive boosted voltage. Alternatively, as shown in FIG. 11, a booster circuit 300 may receive a ground voltage to generate a negative boosted voltage. In this case, in each of the embodiments, the polarity of each transistor included in the booster circuit may be reversed to configure the booster circuit which generates a negative boosted voltage. For example, the boosting cells P101-P104, P201-P204, and P301-P304 and the backflow preventing cells P401-P404 of FIGS. 2A-2C may be adapted as shown in FIGS. 12A-12C. Here, transistors MN1-MN4 have conductivities reverse to those of the transistors M1-M4, respectively.

Figure 13:
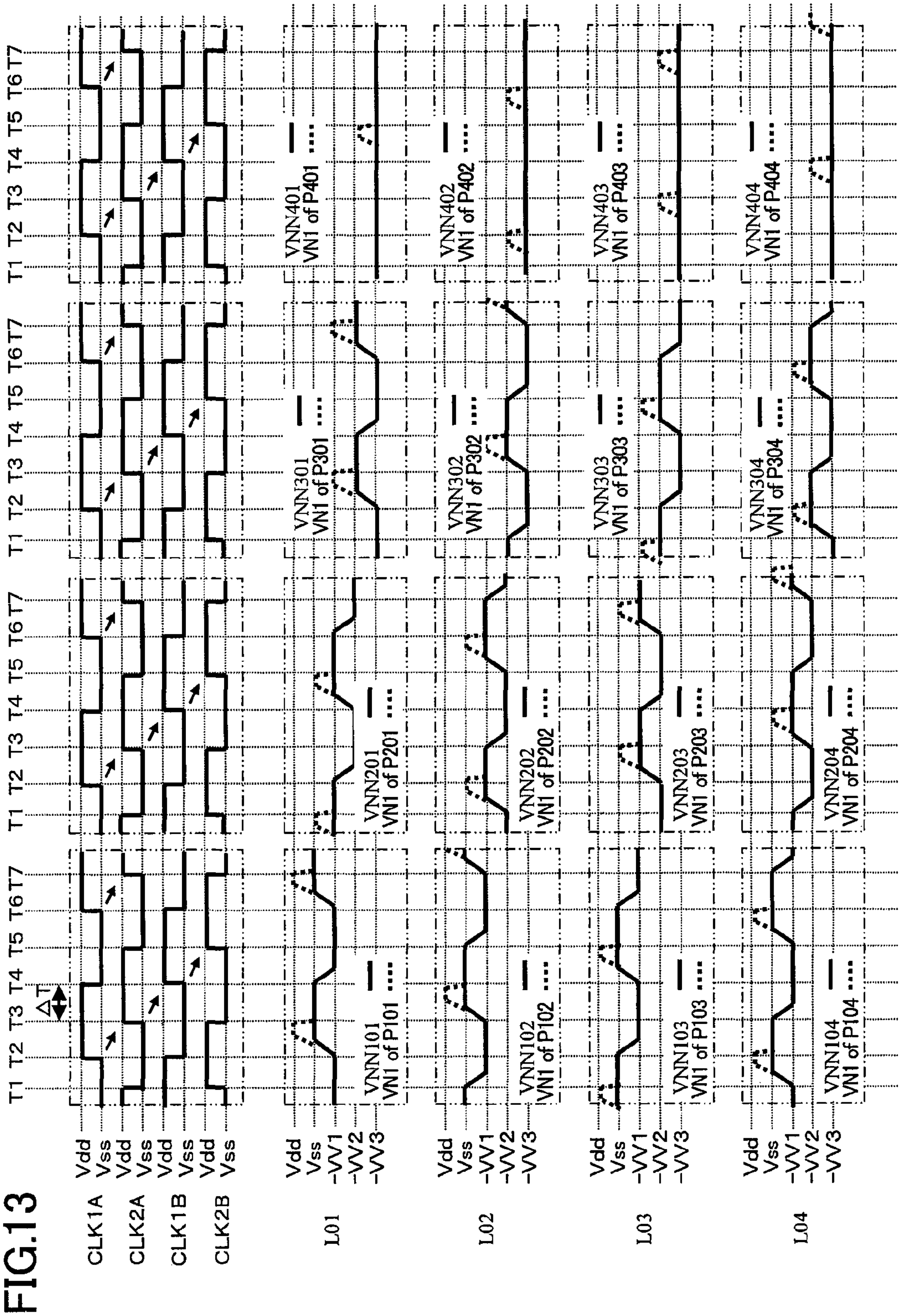
FIG. 13 is a waveform diagram for describing operation of the booster circuit of FIG. 11.
Figure 14:
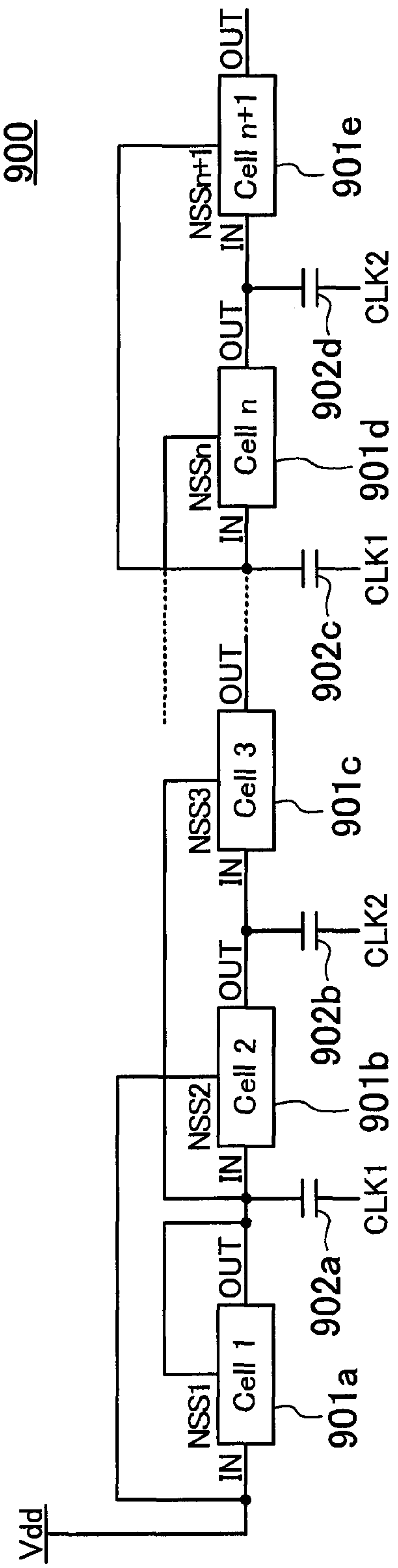
FIG. 14 is a circuit diagram showing a configuration of a conventional booster circuit.
Figure 15:
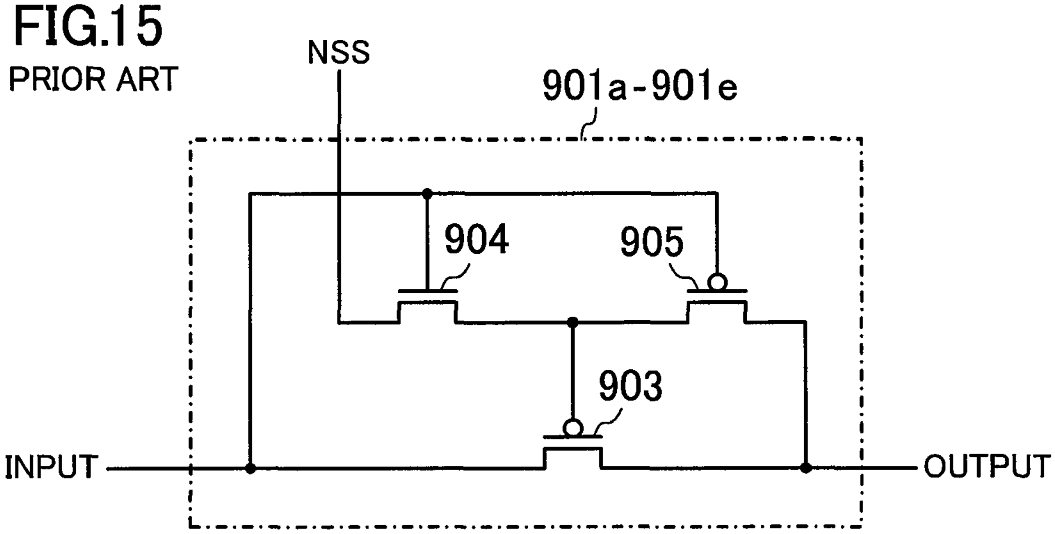
FIG. 15 is a circuit diagram showing a detailed configuration of a charge transfer cell of FIG. 14.
Figure 16:
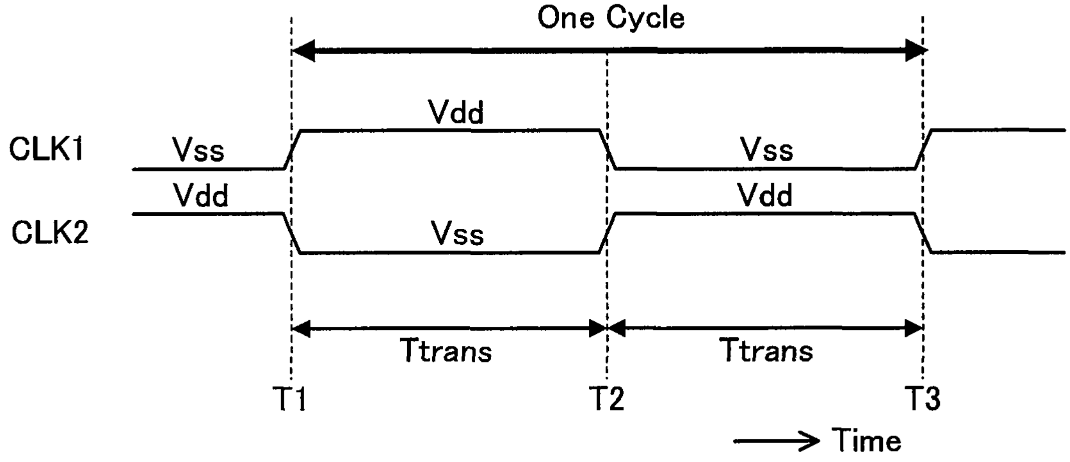
FIG. 16 is a waveform diagram for describing operation of the booster circuit of FIG. 14.

With the configuration of FIG. 11, as shown in FIG. 13, in the booster circuit 300, the amplitudes of the input/output terminal voltages VNN101-VNN104 of the boosting stage ST1 vary between Vss and −VV1. The amplitudes of the input/output terminal voltages VNN201-VNN204 of the boosting stage ST2 vary between −VV1 and −VV2. The amplitudes of the input/output terminal voltages VNN301-VNN304 of the boosting stage ST3 vary between −VV2 and −VV3. The negative booster circuit can generate, at its output terminal, a negative boosted voltage of −VV3. If an N-channel transistor is used as the charge transfer transistor MN1, a well bias control of the N-channel transistor can be performed, whereby the decrease in boosting efficiency due to the charge transfer transistor MN1 can be reduced or prevented.

The booster circuit of the present disclosure can reduce or prevent the backflow of charge via a charge transfer transistor occurring in the two-phase booster circuit, and therefore, is useful as, for example, a power supply generating circuit for improving analog circuit characteristics in a non-volatile semiconductor storage device or a CMOS process. Moreover, the booster circuit of the present disclosure is applicable to nonvolatile semiconductor devices, such as a DRAM and the like, liquid crystal displays, power supply circuits for mobile telephones, and the like.

What is claimed is:

1. A booster circuit comprising:

boosting cells arranged in M parallel lines (M≧4) and L stages (L≧2) and configured to perform boosting operation in synchronization with a plurality of clock signals having different phases, wherein each of the boosting cells includes a first boosting capacitor having two ends, one of the two ends being connected to an output terminal of the each boosting cell, and a clock signal corresponding to the each boosting cell being received at the other end, a first charge transfer transistor connected between an input terminal and the output terminal of the each boosting cell, and a first state controller configured to control the first charge transfer transistor, the first state controller includes a first transistor having a first conductivity type and a second transistor having a second conductivity type, the drains of the first and second transistors being connected to a gate of the first charge transfer transistor, and the input terminal of one of the boosting cells located in the same stage as that of the each boosting cell and in a first one of the lines other than the line of the each boosting cell, is connected to a control terminal of the first state controller for controlling a conductive state and a non-conductive state of the first charge transfer transistor, and the control terminal is connected to gates of the first and second transistors, whereby the M boosting cells in the same stage are connected in a ring shape.

2. The booster circuit of claim 1, wherein the source of the first transistor is connected to the input terminal of one of the boosting cells located in the same stage as that of the each boosting cell and in a second one of the lines other than the line of the each boosting cell, and the source of the second transistor is connected to the output terminal of the each boosting cell.

3. The booster circuit of claim 1, wherein when the each boosting cell is located in the K-th line (1≦K≦M) and in the I-th stage (1≦I≦L), the boosting cell in the first line is located in the KA-th line which is the A-th preceding line (1≦A≦M/2−1: A is a natural number) from the K-th line, where KA=(K−A) when (K−A)>0, and KA=(M−|K−A|) when (K−A)≦0.

4. The booster circuit of claim 3, wherein when the each boosting cell is located in the K-th line (1≦K≦M) and in the I-th stage (1≦I≦L), the boosting cell in the second line is located in the KB-th line which is the B-th preceding line (A+1≦B≦M/2: B is a natural number) from the K-th line, where KB=(K−B) when (K−B)>0, and KB=(M−|K−B|) when (K−B)≦0.

5. The booster circuit of claim 1, further comprising

M backflow preventing cells (M≧4) arranged in parallel and configured to transfer charge in synchronization with the plurality of clock signals, wherein each of the backflow preventing cells includes a second boosting capacitor having two ends, one of the two ends being connected to an intermediate terminal of the each backflow preventing cell, and a clock signal corresponding to the each backflow preventing cell being received at the other end, a second charge transfer transistor connected between an input terminal and an output terminal of the each backflow preventing cell, a diode-connected transistor connected between the input terminal and the intermediate terminal of the each backflow preventing cell, and a second state controller configured to control the second charge transfer transistor, and the input terminal of one of the backflow preventing cells located in a first one of the lines other than the line of the each backflow preventing cell, is connected to a control terminal of the second state controller, whereby the M backflow preventing cells are connected in a ring shape.

6. The booster circuit of claim 1, wherein depending on a voltage of the input terminal, the first state controller switches between a voltage of the input terminal of one of the boosting cells located in the same stage as that of the each boosting cell and in a second one of the lines other than the line of the each boosting cell, and a voltage of the output terminal of the each boosting cell.

7. The booster circuit of claim 6, wherein the source of the first transistor is connected to the input terminal of the boosting cell in the second line, and the source of the second transistor is connected to the output terminal of the each boosting cell.

8. The booster circuit of claim 6, wherein when the each boosting cell is located in the K-th line (1≦K≦M) and in the I-th stage (1≦I≦L), the boosting cell in the first line is located in the KA-th line which is the A-th preceding line (1≦A≦M/2−1: A is a natural number) from the K-th line, where KA=(K−A) when (K−A)>0, and KA=(M−|K−A|) when (K−A)≦0.

9. The booster circuit of claim 8, wherein when the each boosting cell is located in the K-th line (1≦K≦M) and in the I-th stage (1≦I≦L), the boosting cell in the second line is located in the KB-th line which is the B-th preceding line (A+1≦B≦M/2: B is a natural number) from the K-th line, where KB=(K−B) when (K−B)>0, and KB=(M−|K−B|) when (K−B)≦0.

10. The booster circuit of claim 6, further comprising:

M backflow preventing cells (M≧4) arranged in parallel and configured to transfer charge in synchronization with the plurality of clock signals, wherein each of the backflow preventing cells includes a second boosting capacitor having two ends, one of the two ends being connected to an intermediate terminal of the each backflow preventing cell, and a clock signal corresponding to the each backflow preventing cell being received at the other end, a second charge transfer transistor connected between an input terminal and an output terminal of the each backflow preventing cell, a diode-connected transistor connected between the input terminal and the intermediate terminal of the each backflow preventing cell, and a second state controller configured to control the second charge transfer transistor, and depending on a voltage of the input terminal of one of the backflow preventing cells located in a first one of the lines other than the line of the each backflow preventing cell, the second state controller switches between a voltage of the input terminal of one of the backflow preventing cells located in a second one of the lines other than the line of the each backflow preventing cell, and a voltage of the intermediate terminal of the each backflow preventing cell.

11. The booster circuit of claim 1, wherein in each of the boosting cells, depending on a voltage of the input terminal, the charge transfer transistor of the each boosting cell is set to a non-conductive state, and thereafter, the each boosting cell performs boosting operation.

12. The booster circuit of claim 11, wherein when the each boosting cell is located in the K-th line (1≦K≦M) and in the I-th stage (1≦I≦L), the boosting cell in the first line is located in the KA-th line which is the A-th preceding line (1≦A≦M/2−1: A is a natural number) from the K-th line, where KA=(K−A) when (K−A)>0, and KA=(M−|K−A|) when (K−A)≦0.

13. The booster circuit of claim 11, wherein the boosting operation of the boosting cell is to pump the boosting capacitor having one end connected to the output terminal of the boosting cell, depending on the clock signal corresponding to the boosting cell.

14. A backflow preventing circuit comprising:

M backflow preventing cells (M≧4) arranged in parallel and configured to transfer charge in synchronization with a plurality of clock signals, wherein each of the backflow preventing cells includes a boosting capacitor having two ends, one of the two ends being connected to an intermediate terminal of the each backflow preventing cell, and a clock signal corresponding to the each backflow preventing cell being received at the other end, a charge transfer transistor connected between an input terminal and an output terminal of the each backflow preventing cell, a diode-connected transistor connected between the input terminal and the intermediate terminal of the each backflow preventing cell, and a state controller configured to control the charge transfer transistor, the state controller includes a first transistor having a first conductivity type and a second transistor having a second conductivity type, the drains of the first and second transistors being connected to a gate of the charge transfer transistor, and the input terminal of one of the backflow preventing cells located in a first one of the lines other than the line of the each backflow preventing cell, is connected to a control terminal of the state controller for controlling a conductive state and a non-conductive state of the charge transfer transistor, and the control terminal is connected to gates of the first and second transistors, whereby the M backflow preventing cells are connected in a ring shape.

15. The backflow preventing circuit of claim 14, wherein depending on a voltage of the input terminal, the state controller switches between a voltage of the input terminal of one of the backflow preventing cells located in a second one of the lines other than the line of the each backflow preventing cell, and a voltage of the intermediate terminal of the each backflow preventing cell.

* * * * *